United States Patent
MacQueen et al.

(10) Patent No.: US 6,399,670 B1
(45) Date of Patent: Jun. 4, 2002

(54) COATING HAVING MACROSCOPIC TEXTURE AND PROCESS FOR MAKING SAME

(75) Inventors: Richard C. MacQueen, Phillipsburg, NJ (US); Loyd J. Burcham, Horsham, PA (US); Anthony A. Parker, Newtown, PA (US); Deborah A. Sciangola, Glenmoore, PA (US)

(73) Assignee: Congoleum Corporation, Trenton, NY (US)

( * ) Notice: Subject to any disclaimer, the term of this patent is extended or adjusted under 35 U.S.C. 154(b) by 0 days.

(21) Appl. No.: 09/489,420

(22) Filed: Jan. 21, 2000

(51) Int. Cl.[7] .............................. C08K 3/22; C08K 3/34; C08K 5/54; C09D 1/00; C09D 175/16

(52) U.S. Cl. .............................. 522/64; 522/77; 522/81; 522/83; 522/96; 522/142; 522/173; 522/182

(58) Field of Search .............................. 522/71, 81, 82, 522/83, 64, 96, 182, 181, 170, 120, 121, 173, 77, 148, 142

(56) References Cited

U.S. PATENT DOCUMENTS

| | | |
|---|---|---|
| 2,801,185 A | 7/1957 | Iler |
| 3,267,187 A | 8/1966 | Slosberg et al. |
| 3,506,474 A | 4/1970 | Neuhaus et al. |
| 3,639,160 A | 2/1972 | Nelson |
| 3,956,530 A | 5/1976 | McKee, Jr. et al. |
| 3,958,043 A | 5/1976 | McKee, Jr. et al. |
| 3,958,054 A | 5/1976 | McKee, Jr. et al. |
| 3,996,328 A | 12/1976 | Coffin et al. |
| 3,999,940 A | 12/1976 | Freeman |
| 4,008,349 A | 2/1977 | Ehrenfeld, Jr. et al. |
| 4,015,036 A | 3/1977 | Haemer |
| 4,022,643 A | 5/1977 | Clark |
| 4,036,673 A | 7/1977 | Murphy et al. |
| 4,059,709 A | 11/1977 | Conger et al. |

(List continued on next page.)

OTHER PUBLICATIONS

Gallouédec et al., "Enhancement of mechanical and optical properties of waterborne polyurethane lacquers on plastic surfaces by using ultra–fine polyamide powders. A new approach to "soft feel" coatings," *Waterborne, High–Solids, and Powder Coatings Symposium*, Feb. 14–16, 1996. New Orleans, LA.

(List continued on next page.)

*Primary Examiner*—Susan W. Berman
(74) *Attorney, Agent, or Firm*—Pennie & Edmonds LLP

(57) ABSTRACT

In one embodiment the present invention provides a coated substrate comprising a substrate, a radiation-cured coating on at least a portion of the substrate, wherein the coating comprises an inherent macroscopic texture. In another embodiment, the present invention provides a pre-cured coating mixture comprising a radiation-curable resin and an initiator, wherein the radiation-curable resin and the initiator form a pre-cured coating mixture capable of forming a macroscopic texture upon application of the mixture on a substrate. In another embodiment the present invention provides a pre-cured coating mixture comprising a radiation-curable resin, an initiator, and texture-producing particles having an effective size to provide a macroscopic texture upon application of the mixture on a substrate. In another embodiment, the present invention provides a coated substrate comprising a substrate and a radiation-cured coating on at least a portion of the substrate, wherein the coating comprises an inherent macroscopic texture. In addition, the present invention provides a process for making a coating on a substrate, comprising the steps of distributing a pre-cured coating mixture comprising a radiation-curable resin and an initiator over at least a portion of a substrate to form a pre-cured coating having a macroscopic texture, and radiation-curing the pre-cured coating to form a radiation-cured coating having the macroscopic texture.

17 Claims, 16 Drawing Sheets

U.S. PATENT DOCUMENTS

| | | | |
|---|---|---|---|
| 4,066,813 A | 1/1978 | Winters et al. |
| 4,068,030 A | 1/1978 | Witman |
| 4,071,592 A | 1/1978 | Frisch |
| 4,083,907 A | 4/1978 | Hamilton |
| 4,086,377 A | 4/1978 | Barchi |
| 4,089,296 A | 5/1978 | Barchi |
| 4,089,724 A | 5/1978 | Bomboire |
| 4,126,727 A | 11/1978 | Kaminski |
| 4,130,939 A | 12/1978 | Toal |
| 4,169,167 A | 9/1979 | McDowell |
| 4,187,131 A | 2/1980 | Shortway et al. |
| 4,191,581 A | 3/1980 | Hamilton |
| 4,212,691 A | 7/1980 | Poptsky et al. |
| 4,214,028 A | 7/1980 | Shortway et al. |
| 4,217,385 A | 8/1980 | Shortway et al. |
| 4,232,076 A | 11/1980 | Stetson et al. |
| 4,244,899 A | 1/1981 | Henshaw |
| 4,248,922 A | 2/1981 | Shortway et al. |
| 4,263,051 A | 4/1981 | Crawford et al. |
| 4,264,643 A | 4/1981 | Granata et al. |
| 4,273,819 A | 6/1981 | Schmidle et al. |
| 4,274,916 A | 6/1981 | Grose |
| 4,277,427 A | 7/1981 | Kaminski et al. |
| 4,278,483 A | 7/1981 | Mansolillo |
| 4,298,646 A | 11/1981 | Haemer et al. |
| 4,304,815 A | 12/1981 | Cugasi, Jr. |
| 4,313,969 A | 2/1982 | Matthews et al. |
| 4,331,579 A | 5/1982 | Haemer |
| 4,337,296 A | 6/1982 | Varadhachary |
| 4,348,447 A | 9/1982 | Miller, Jr. et al. |
| 4,355,063 A | 10/1982 | Palmer et al. |
| 4,358,476 A | 11/1982 | Zimmer et al. |
| 4,361,626 A | 11/1982 | Boba et al. |
| D268,793 S | 4/1983 | Tejeda et al. |
| 4,388,760 A | 6/1983 | Aspy |
| 4,389,514 A | 6/1983 | Schmidle et al. |
| 4,393,187 A | 7/1983 | Boda et al. |
| 4,401,611 A | 8/1983 | Mansolillo et al. |
| 4,405,657 A | 9/1983 | Miller, Jr. et al. |
| 4,418,109 A | 11/1983 | Miller, Jr. et al. |
| 4,421,784 A | 12/1983 | Troue |
| 4,440,826 A | 4/1984 | Witman |
| 4,443,505 A | 4/1984 | Ehrenfeld, Jr. |
| 4,450,194 A | 5/1984 | Kauffman et al. |
| 4,454,188 A | 6/1984 | Penta |
| 4,456,643 A | 6/1984 | Coyler |
| 4,467,007 A | 8/1984 | Elgie |
| 4,478,876 A | 10/1984 | Chung |
| 4,483,732 A | 11/1984 | Penta et al. |
| 4,483,884 A | 11/1984 | Troue |
| 4,485,123 A | 11/1984 | Troue |
| 4,491,616 A | 1/1985 | Schmidle et al. |
| 4,501,783 A | 2/1985 | Hiragami et al. |
| 4,522,958 A | 6/1985 | Das et al. |
| 4,526,910 A | 7/1985 | Das et al. |
| 4,530,856 A | 7/1985 | Kauffman et al. |
| 4,547,245 A | 10/1985 | Colyer |
| 4,609,431 A | 9/1986 | Grose |
| 4,618,530 A | 10/1986 | Stetson |
| 4,652,470 A | 3/1987 | Das et al. |
| 4,675,212 A | 6/1987 | Wiley et al. |
| 4,677,004 A | 6/1987 | Das et al. |
| 4,680,204 A | 7/1987 | Das et al. |
| 4,689,259 A | 8/1987 | Miller, Jr. et al. |
| 4,699,820 A | 10/1987 | Herr, Jr. et al. |
| 4,717,620 A | 1/1988 | Bowen et al. |
| 4,761,306 A | 8/1988 | Clark et al. |
| 4,794,020 A | 12/1988 | Lussi et al. |
| 4,844,849 A | 7/1989 | Miller et al. |
| RE33,069 E | 9/1989 | Courtoy et al. |
| 4,931,331 A | 6/1990 | Owens |
| 4,958,399 A | 9/1990 | Toal et al. |
| RE33,599 E | 5/1991 | Courtoy et al. |
| 5,015,516 A | 5/1991 | Lussi et al. |
| 5,023,140 A | 6/1991 | Glotfelter et al. |
| 5,059,471 A | 10/1991 | McNally et al. |
| 5,077,112 A | 12/1991 | Hensel et al. |
| 5,080,954 A | 1/1992 | Mackey, Sr. et al. |
| H1029 H | 3/1992 | Reinhart |
| 5,104,929 A | 4/1992 | Bilkadi |
| 5,120,811 A | 6/1992 | Glotfelter et al. |
| 5,124,202 A | 6/1992 | Fernando et al. |
| 5,153,047 A | 10/1992 | Mackey, Sr. et al. |
| 5,178,912 A | 1/1993 | Piacente et al. |
| 5,208,086 A | 5/1993 | Owens |
| 5,246,764 A | 9/1993 | LaPorte et al. |
| 5,252,655 A | 10/1993 | Parker et al. |
| 5,260,118 A | 11/1993 | Lussi et al. |
| 5,290,591 A | 3/1994 | Lussi et al. |
| 5,308,683 A | 5/1994 | Dees, Jr. et al. |
| 5,316,855 A | 5/1994 | Wang et al. |
| 5,336,693 A | 8/1994 | Frisch |
| 5,344,704 A | 9/1994 | O'Dell et al. |
| 5,348,760 A | 9/1994 | Parker et al. |
| 5,411,811 A | 5/1995 | Piacente et al. |
| 5,460,701 A | 10/1995 | Parker et al. |
| 5,494,729 A | 2/1996 | Henry et al. |
| 5,506,030 A | 4/1996 | Landers et al. |
| 5,531,944 A | 7/1996 | Frisch |
| 5,536,530 A | 7/1996 | Landers et al. |
| 5,536,571 A | 7/1996 | Pearson et al. |
| 5,543,173 A | 8/1996 | Horn, Jr. et al. |
| 5,571,588 A | 11/1996 | Lussi et al. |
| 5,585,415 A | 12/1996 | Gorzalski et al. |
| 5,618,577 A | 4/1997 | Pearson et al. |
| 5,627,231 A | 5/1997 | Shalov et al. |
| 5,645,889 A | 7/1997 | Potosky et al. |
| 5,648,407 A | 7/1997 | Goetz et al. |
| 5,679,443 A | 10/1997 | Barrows et al. |
| 5,712,018 A | 1/1998 | Frisch |
| 5,718,907 A | 2/1998 | Labarre |
| 5,728,332 A | 3/1998 | Frisch et al. |
| 5,733,630 A | 3/1998 | Frisch et al. |
| 5,736,008 A | 4/1998 | Barrows et al. |
| 5,737,851 A | 4/1998 | Novak et al. |
| 5,760,126 A | 6/1998 | Engle et al. |
| 5,763,048 A | 6/1998 | Takahashi |
| 5,830,937 A | 11/1998 | Shalov et al. |
| 5,853,809 A | 12/1998 | Campbell et al. |
| 5,858,160 A | 1/1999 | Piacente et al. |
| 5,874,684 A | 2/1999 | Parker et al. |
| 5,919,549 A * | 7/1999 | Van et al. ................... 428/141 |
| 5,928,394 A * | 7/1999 | Stoetzel ....................... 51/295 |
| 5,965,198 A | 10/1999 | Plusquellec et al. |
| 6,217,432 B1 * | 4/2001 | Woo ........................... 451/534 |
| 6,218,001 B1 | 4/2001 | Chen et al. |
| 6,228,493 B1 | 5/2001 | Chen et al. |
| 6,291,078 B1 | 9/2001 | Chen et al. ................. 428/543 |

OTHER PUBLICATIONS

Hoorn et al., 1995, "Metal–binding affinity of a series of ω–amino–alkylbenzimidazoles immobilized on silica," *Reactive and Functional Polymers* 27:223–235.

Misra et al., 1998, "Hybrid inorganic–organic UV–curable abrasion–resistant coatings," *Surface Coatings International* 12:594–595.

Gallouedec et al., "Optimizing the use of ultrafine microporous polyamide powders to obtain low–gloss UV curable coatings," *Radtech Report*, Sep./Oct. 1995, pp. 18–24.

* cited by examiner

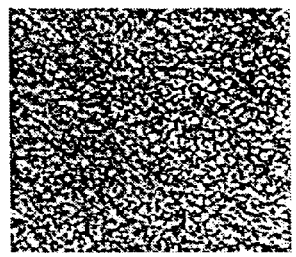
FIG. 11
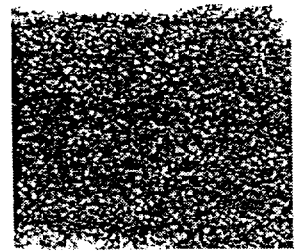
FIG. 12
FIG. 13
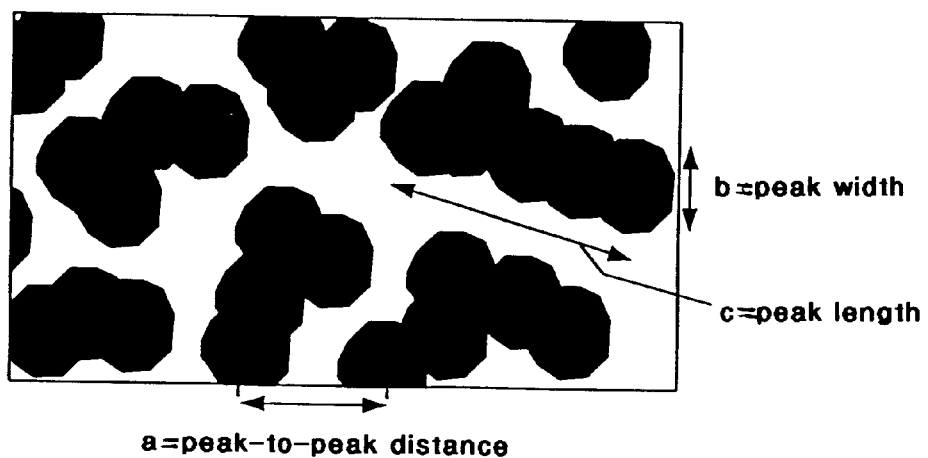

a = distance between branches  
c = branch length b = branch width

COATING HAVING MACROSCOPIC TEXTURE AND PROCESS FOR MAKING SAME

BACKGROUND OF THE INVENTION

1. Field of the Invention

The invention relates generally to a coating composition and process for making the coating. More specifically, the invention relates to radiation-cured coatings having a macroscopic texture that provides superior abrasion resistance and unique aesthetic qualities.

2. Description of Related Art

Radiation-curable coatings are used in many applications throughout the coatings industry, such as protective coatings for various substrates, including plastic, metal, wood, ceramic, and others, and the advantages of radiation-curing compared to thermal curing are well known in the art. These coatings are typically resin-based mixtures that are usually cured using ultraviolet (UV) radiation. The resins are typically mixtures of oligomers and monomers that polymerize upon exposure to UV radiation resulting in a cured coating.

Various other components may be added to the resin mixture. A photosensitizer or photoinitiator may be added to cause cross-linkage of the polymers upon exposure to UV radiation. Flatting agents, such as silica, may be added to reduce or control the level of gloss in the cured coating; however, U.S. Pat. No. 4,358,476 discloses that excessive concentrations of flatting agents may result in undesirably high viscosities impeding proper application of the coating to a substrate, potential separation of the resin into separate phases, and a deleterious effect on the efficacy of the UV radiation. U.S. Pat. No. 5,585,415 describes the use of a pigmented composition and various photoinitiators that produce a uniform microscopic surface wrinkling that provides a low gloss surface without the use of flatting agents. Various other components, such as fillers, plasticizers, antioxidants, optical brighteners, defoamers, stabilizers, wetting agents, mildewcides and fungicides, surfactants, adhesion promoters, colorants, dyes, pigments, slip agents, fire and flame retardants, and release agents, may also be added to the resin mixture to provide additional functionality.

An important aspect of these coatings is their level of scratch or abrasion resistance. Good abrasion resistance is desirable so that the integrity and appearance of the coating is maintained. For example, a superior abrasion-resistant coating would be desirable for a flooring substrate, since flooring is typically exposed to a variety of abrasives. Improvements in the abrasion-resistance of coatings has been accomplished through various techniques. U.S. Pat. No. 4,478,876 describes the addition of colloidal silica to hydrolyzable silanes and polymers derived from a combination of acryloxy functional silanes and polyfunctional acrylate monomers. Another technique is the use of compositions containing acrylate or methacrylate functionalities on a monomer, oligomer, or resin. U.S. Pat. No. 5,104,929 describes the use of colloidal silica dispersions in certain acrylate or methacrylate ester monomers or mixtures thereof. U.S. Pat. No. 5,316,855 describes the use of a cohydrolyzed metal alkoxide sol with a trialkoxysilane-containing organic component having the trialkoxysilane.

These radiation-cured coatings generally have a substantially smooth, exposed surface such that there is no macroscopic texture or texture visible to the naked eye. This type of smooth surface provides for ease of cleaning. Some radiation-cured coatings have a microscopic texture as described in U.S. Pat. No. 5,585,415. The individual features of this texture are not visible to the naked eye, but the combined effect of the microscopic texture results in the scattering of visible light that results in a matte or low gloss appearance. This texture is provided by the coating curing process which results in microscopic wrinkles on the surface of the coating. While the microscopic dimensions of this texture provide a matte finish, these dimensions also make the coating susceptible to particle entrapment within the microscopic wrinkles. This particle entrapment results in a visibly dirty surface that is difficult to clean. Another microscopic texture found in radiation-curable coatings results from the addition of flatting agents to the uncured coating mixture. During the curing process these flatting agents, which are small inorganic or organic particles, concentrate at the coating surface to form a microscopically rough surface that scatters visible light resulting in a matte finish. The size of the particle used is typically such that it is no larger in diameter than the average thickness of the cured coating. Particles much larger than the coating thickness do not result in a matte finish and are not desired. Since most radiation-cured coatings are no more than 75–100 $\mu$m thick, and since UV radiation can not typically penetrate any deeper, typical flatting agent particles for UV-cured coatings range in size from 0.1–100 $\mu$m. Flatting agents are well known in the art as described, for example, in F. D. C. Gallouedec et al., "Optimization of Ultrafine Microporous Powders to Obtain Low-Gloss UV Curable Coatings," Radtech Report, September/October 1995, pp 18–24.

To produce such macroscopically smooth surfaces requires the application of a coating mixture that can be easily distributed across the substrate to be coated. If the coating mixture has a high viscosity, for example, the coating will not distribute smoothly. Therefore, it is preferable to use a lower viscosity coating to produce such a macroscopically smooth coating surface.

Other coatings provide a macroscopically textured surface by methods other than radiation-curing. In chemical embossing, for example, a macroscopic texture is formed based upon the use of various chemicals added to the substrate. In mechanical embossing, the substrate itself is imprinted with the desired textural pattern. In both types of embossing, the subsequently applied coating naturally conforms to the shape of the substrate textural pattern. However, any desired change to the textural pattern requires changes in the amount and type of chemicals added to the substrate and/or the replacement of the roller used to mechanically imprint the pattern on the substrate, which can be significantly expensive and time consuming. Furthermore, neither the coating itself or its application are inherently providing the desired texture. In another form of mechanical embossing, texture may be achieved by impressing a given pattern on the cured coating itself. Similarly, however, the texture is not produced inherently by the coating itself or its application.

Based on the foregoing, there is a need for a superior abrasion-resistant, radiation-cured coating for various substrates including plastic, metal, wood, and ceramic, among others, having a macroscopic texture. In addition, there is a need for a coating having a macroscopic texture that is easily cleanable and that provides certain aesthetic properties. Further, there is a need for a method to produce such a superior abrasion-resistant, radiation-cured coating having a macroscopic texture using a high viscosity pre-cured coating mixture and/or texture-producing particles.

SUMMARY OF THE INVENTION

In one embodiment the present invention provides a coated substrate comprising a substrate, a radiation-cured coating on at least a portion of the substrate, wherein the coating comprises an inherent macroscopic texture. In another embodiment, the present invention provides a pre-cured coating mixture comprising a radiation-curable resin and an initiator, wherein the radiation-curable resin and the initiator form a pre-cured coating mixture capable of forming a macroscopic texture upon application of the mixture on a substrate. In another embodiment the present invention provides a pre-cured coating mixture comprising a radiation-curable resin, an initiator, and texture-producing particles having an effective size to provide a macroscopic texture upon application of the mixture on a substrate. In another embodiment, the present invention provides a coated substrate comprising a substrate and a radiation-cured coating on at least a portion of the substrate, wherein the coating comprises an inherent macroscopic texture. In addition, the present invention provides a process for making a coating on a substrate, comprising the steps of distributing a pre-cured coating mixture comprising a radiation-curable resin and an initiator over at least a portion of a substrate to form a pre-cured coating having a macroscopic texture, and radiation-curing the pre-cured coating to form a radiation-cured coating having the macroscopic texture.

The coating of the present invention provides a top coat or protective coating having a macroscopic texture to substrates containing plastic such as polyvinyl chloride, metal, cellulose, fiberglass, wood, and ceramic, among others. The coating of the present invention provides superior scratch or abrasion resistance and good transparency. In addition, the coating of the present invention is easily cleanable, and the macroscopic texture provides an aesthetic aspect to the coating.

Other embodiments and features of the present invention will appear from the following description in which the preferred embodiments are set forth in detail in conjunction with the accompanying drawings.

BRIEF DESCRIPTION OF THE DRAWINGS

FIG. 11 is an illustration of the coated texture of FIG. 9;

FIG. 12 is an illustration of the coated texture of FIG. 10;

FIG. 13 is an illustration of the general type of macroscopic texture according to one embodiment of the present invention;

DETAILED DESCRIPTION OF THE PREFERRED EMBODIMENTS

Figure 1:
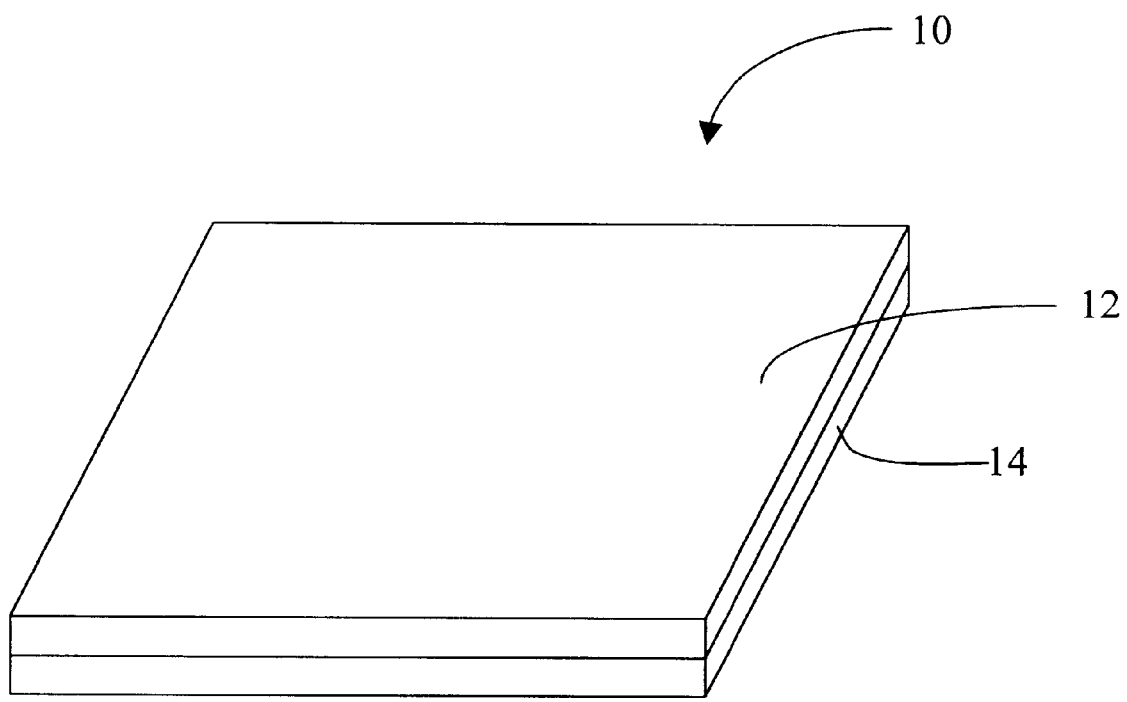
FIG. 1 illustrates a perspective view of a coated substrate 10 according to one embodiment of the present invention.

The present invention provides a coating having a macroscopic texture that exhibits superior abrasion-resistance, aesthetic value, and ease of cleaning. It should be appreciated that an important aspect of the present invention is that the macroscopic texture is provided inherently by the coating itself. In addition, the present invention provides a pre-cured coating mixture and a process for using the pre-cured coating mixture to generate the coating of the present invention on a substrate.

It should be appreciated that the term "coating" refers to the cured coating that typically would reside as an outer or exposed layer on a substrate after it has been cured or finally processed. The term "radiation-cured" means after curing has occurred; therefore, the coating of the present invention, for example, may also be referred to as a "radiation-cured coating." The term "radiation-curable" means prior to curing or capable of being cured, and the term "pre-cured" means prior to curing.

The pre-cured coating mixture generally comprises a radiation-curable resin and an initiator. The radiation-curable resin may be any resin capable of being cured using radiant energy. Radiant energy can be transferred through wave phenomenon and subatomic particle movement. Most preferred forms of radiant energy are ultraviolet (UV) and electron beam energy. Preferably, the radiation-curable resin comprises organic monomers, oligomers, or both. U.S. Pat. Nos. 4,169,167, 4,358,476, 4,522,958, 5,104,929, 5,585,415, 5,648,407, and 5,858,809, incorporated herein by reference, describe various resins, including crosslinkable (thermosetting) resins, that may be used in the present invention.

More preferably, the radiation-curable resin comprises a mixture of crosslinkable monomers and oligomers that contain on average from 1–20 reactive groups per molecule of monomer or oligomer, where the reactive group provides the functionality for polymerization upon exposure to radiation. More preferably, the number of reactive groups per molecular is from 1–6. Preferred reactive groups include acrylate, vinyl, lactone, oxirane, vinyl ether, and hydroxyl. More preferred reactive groups include acrylate, oxirane, vinyl ether, and hydroxyl. The most preferred monomers and oligomers, however, are acrylates. Acrylates have the following structure:

where R can be hydrogen, or alkyl, including, but not limited to, methyl, ethyl, propyl, butyl, etc. These radiation-curable resins are readily available or may be synthesized by procedures well known to one of skill in the art. It is noted that the term "radiation-cured groups" refers to these reactive groups after they have been cured.

The oligomers and monomers can also have 1–100 non-radiation-curable functional groups per molecule of monomer or oligomer. Preferred non-radiation-curable functional groups include urethane, melamine, triazine, ester, amide, ethylene oxide, propylene oxide, and siloxane. More preferred non-reactive groups are urethane, ethylene oxide, and propylene oxide.

As will be further described below in connection with the process for making the coating of the present invention, the concentration of the radiation-curable resin is dependent upon several factors. In one preferred embodiment, the concentration of the radiation-curable resin is selected to provide an effective or desired viscosity of the pre-cured coating mixture. The effective viscosity of the pre-cured coating mixture is that viscosity capable of producing a macroscopic texture, described below, upon application of the pre-cured coating mixture to a substrate and subsequent curing. Preferably, the viscosity of the pre-cured coating mixture is approximately 100,000–1,000,000 cPs at a shear rate of 0.150 s$^{-1}$ at the application temperature. Therefore, the radiation-curable resin may comprise approximately 50–99%, by weight of the pre-cured coating mixture to provide the desired viscosity. Preferably, the radiation-curable resin comprises approximately 70–99%, by weight, of the pre-cured coating mixture. Of course, the viscosity of the pre-cured coating mixture, and, therefore, the concentration of the radiation-curable resin, will be affected by the use of additional components in the pre-cured coating mixture such as rheological control agents, which will be described below. Other factors that affect the concentration of the radiation-curable resin are well known to one of skill in the art.

The initiator may be any chemical capable of assisting or catalyzing the polymerization and crosslinking of the radiation-curable resin upon exposure to radiation. The initiator may generally be a photoinitiator or photosensitizer. Such initiators are well known in the art and may be selected based upon the curing conditions used (e.g., curing in an inert environment or in air). Specifically, the initiator may be a free radical photoinitiator, a cationic photoinitiator, and mixtures of both of these. Preferred free radical photoinitiators include acyl phosphine oxide derivatives, benzophenone derivatives, and mixtures thereof. Preferred cationic photoinitiators include triarylsulphonium salts, diarylidodonium salts, ferrocenium salts, and mixtures thereof. It should be appreciated that the initiator refers to the initiator both before and after curing. Therefore, the initiator may have a different chemical structure or composition in the radiation-cured coating after exposure to radiation.

The concentration of a particular initiator is that amount necessary to provide satisfactory curing for a given pre-cured resin based upon the properties of that particular initiator. Such concentrations can be readily identified by one of skill in the art. A preferred concentration of the initiator is 0.01–10 parts per hundred resin (phr), and a more preferred concentration is 0.1–4 phr.

The pre-cured coating mixture may also comprise a rheological control agent (RCA), particularly if the pre-cured coating mixture does not have an inherent viscosity that is high enough to form a macroscopic texture upon application of the pre-cured coating mixture to a substrate. The RCA may be inorganic particles, organic solids, and mixtures of both.

The inorganic particles may be any inorganic solid having a size that is small enough to be included in the pre-cured coating mixture without deleteriously affecting the pre-cured coating mixture's ability to cure and adhere to a substrate. The particle should also be sufficiently small and/or closely match the refractive index of the cured coating such that the opacity of the cured coating is minimized. The particle should also not deleteriously affect the cured coating's abrasion resistance and in some cases it can improve that property. Additionally, the particle should not deleteriously affect the resistance of the cured coating to chemical attack by strongly basic aqueous media (i.e., the alkali resistance of the coating), since such alkali resistance is important in flooring materials. It should be appreciated that the size of these particles is such that they do not directly provide or contribute to the macroscopic texture. Preferred sizes of the inorganic particles are 1–100 nm, where 10–60 nm are most preferred.

Preferably, the inorganic particles are metal oxides, metals, or carbonates, where metal oxides are preferred. More preferably, the inorganic particles are alumina, aluminosilicates, alumina coated on silica, silica, fumed alumina, fumed silica, calcium carbonate, and clays. Still more preferred is alumina due to its superior hardness (for abrasion resistance) and for its greater alkali resistance relative to silica. Most preferred is nanometer-sized alumina with a particle size range of 27–56 nm due to the enhanced cured coating transparency afforded by such small particles when they are well-dispersed (e.g., through the use of an appropriate amount and type of coupling agent). However, since alumina has a higher refractive index (i.e., ~1.7) than most organic coatings and silica (both ~1.5), it may be envisioned that a nanometer-sized aluminosilicate material will give the optimal combination of transparency: abrasion resistance, and alkali resistance.

The inorganic particles may comprise approximately 1–80%, by weight, of the pre-cured coating mixture, more preferably 1–50%, by weight, and most preferably 1–25%, by weight. Even more preferably, if nanometer-sized alumina is used, its concentration is approximately 1–40%, by weight, of the pre-cured coating mixture. If fumed silica is used, its concentration is approximately 1–10%, by weight, of the pre-cured coating mixture. If nanometer-sized crystalline silica is used, its concentration is approximately 10–30%, by weight, of the pre-cured coating mixture. If exfoliated clay is used, its concentration is approximately 10–30%, by weight, of the pre-cured coating mixture.

Similarly, the organic solids may be any organic solid having a size that is small enough to be included in the pie-cured coating mixture without deleteriously affecting the pre-cured coating mixture's ability to cure and adhere to a substrate. As with the inorganic particles, the organic particles should also not deleteriously affect the cured coating's transparency or abrasion resistance. Unlike the inorganic particles, the organic particles may dissolve or partially dissolve into the pre-cured resin at elevated temperature and thicken the pre-cured coating mixture upon cooling. The organic solids may be low molecular weight waxes containing functionality such as acid, amine, amide, hydroxyl, urea; polymers of ethylene glycol; polymers of propylene glycol; natural polymers such as guar, gelatin, and corn starch; polyamides; polypropylene; and mixtures of any of these. Most preferred are functional waxes. The organic solids may comprise approximately 1–50%, by weight, of the pre-cured coating mixture. More preferably, the organic solids comprise between approximately 1–20%, by weight. Most preferably, if functional waxes are used, their concentration is approximately 1–10%, by weight, of the pre-cured coating mixture. As will be described below in connection with the process for making the coating of the present invention, the RCA may added for several purposes.

A coupling agent or dispersing agent may also be added for purpose of aiding the dispersion of the RCA in the pre-cured coating mixture. The coupling agent may be any material that provides surfactant-like properties and is capable of enhancing the dispersion of the RCA in the pre-cured coating mixture, in particular, the dispersion of inorganic particles. The coupling agent ideally forms a chemical and/or physical bond with the pre-cured coating mixture and the inorganic particle, which improves the adhesion of the particle to the pre-cured coating mixture. Generally, the coupling agent is a organo-silicon or organo-fluorine containing molecule or polymer. Preferred organo-silicon materials are organosilanes and more preferably a prehydrolyzed organosilane. The coupling agent may also be vinyl phosphonic acid or mixtures of phosphonic acid with the prehydrolyzed organosilane. The concentration of the dispersing agent may be approximately 0.1–20%, by weight, in the pre-cured coating mixture, and more preferably approximately 0.1–15%, by weight.

A flatting agent may also be added to the pre-cured coating mixture of the present invention. Flatting agents are well known in the art. Preferred flatting agents include organic particles having a size of approximately 0.1–100 microns, inorganic particles having a size of approximately 0.1–100 microns, and mixtures of both. When flatting agents are used, a coupling agent may be needed to obtain good dispersion in the pre-cured coating mixture and good adhesion between the particle and the cured coating. For inorganic flatting agents, preferred coupling agents are organosilanes. The particle size selected is such that it is about the same size as the coating thickness or smaller. More preferred flatting agents include silica, alumina, polypropylene, polyethylene, waxes, ethylene copolymers, polyamide, polytetrafluoroethylene, urea-formaldehyde and combinations thereof The concentration of the flatting agent may be approximately 2–25%, by weight, of the pre-cured coating mixture, and more preferably is 5–20%, by weight.

In addition to the foregoing components of the pre-cured coating mixture, texture-producing particles may also be added. Such texture-producing particles have an effective size or an average diameter that is larger than the pre-cured coating thickness after it has been applied to a substrate. These texture-producing particles, therefore, may act to provide the macroscopic texture of the coating of the present invention. It should be appreciated that these texture-producing particles may be added to a pre-cured coating mixture that has an effective viscosity or to a pre-cured coating mixture that does not have an effective viscosity. In the latter case, the macroscopic texture would be produced only by the texture-producing particles.

The degree of texture provided by the texture-producing particles is controlled by the ratio of the particle size to the thickness of the cured coating. As this ratio increases from 1, the texture becomes macroscopic and can be made more aggressive (visibly rougher) as the ratio is increased. The degree of aggressiveness of the texture is determined by the desired end use properties such as abrasion resistance and cleanability. It is important that the particles selected have good adhesion to the cured coating. These particles can be inorganic or organic materials. A coupling agent may be necessary to obtain good dispersion in the pre-cured coating mixture and good adhesion between the particle and the cured coating. Preferred inorganic particles are glass, ceramic, alumina, silica, aluminosilicates, and alumina coated on silica. Preferred coupling agents for inorganic texture-producing particles are organosilanes. Preferred organic particles are thermoplastic and thermosetting polymers. Most preferred organic particles are polyamide, including nylons, specifically, nylon 6 and nylon 12 (although one of skill in the art will recognize that other nylons may be used in the present invention), polypropylene, polyethylene, polytetrafluoroethylene, ethylene copolymers, waxes, epoxy, and urea-formaldehyde. Preferred average particle size of both organic and inorganic particles is 30–350 $\mu$m. Most preferred is 30–150 $\mu$m. Preferred concentration of particles in the pre-cured coating mixture is 1–30%, by weight. The most preferred concentration is 5–15% by weight.

A preferred embodiment of a pre-cured coating mixture of the present invention comprises, by weight, 79.44% of a resin mixture comprising, by weight, 53.4% urethane acrylate (ALUA 1001, available from Congoleum Corporation, Mercerville, N.J.), 8.8% ethoxylated diacrylate (SR 259 available from Sartomer, Exton, Pa., 24.3% propoxylated diacrylate (SR 306 available from Sartomer, Exton, Pa.), 13.4% ethoxylated trimethlyolpropane triacrylate (SR 454 available from Sartomer, Exton, Pa.), and 0.1% acylphosphine oxide (LUCERIN TPO available from BASF); 12.00% flatting agent comprising 5 micron nylon particles (ORGASOL 2001 UD available from Elf Atochem, Philadelphia, Pa.); 6.25% texture-proclucing particles comprising 60 micron nylon 12 particles (ORGASOL 2002 ES 6 available from Elf Atochem, Philadelphia, Pa.); 2.00% alumina RCA having a particle size distribution in the range of 27–56 nm (NANOTEK ALUMINA #0100 available from Nanophase Technologies Corp. Burr Ridge, Ill.); and 0.31% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below.

It should be appreciated that many additional components known in the art may be added to the coatings of the present invention. These additional components may include fillers, plasticizers, antioxidants, optical brighteners, defoamers, stabilizers, wetting agents, mildewcides and fungicides, surfactants, adhesion promoters, colorants, dyes, pigments, slip agents, fire and flame retardants, and release agents.

FIG. 1 illustrates a perspective view of a coated substrate 10 according to one embodiment of the present invention. In FIG. 1 a coating 12 is adhered to a substrate 14, where the coating 12 is produced by curing the pre-cured coating mixture made according to the present invention. It should be appreciated that the coating of the present invention may be used in conjunction with any substrate that is capable of remaining attached to the coating after curing. Substrates that may be used include those containing plastic such as polyvinyl chloride, metal, cellulose, fiberglass, wood, and ceramic, among others. Preferably, the substrate is a flooring material, such as a floor tile or flexible sheet, where the surface of the coating having the macroscopic texture is the exposed surface of the flooring, or that surface upon which one would walk. The superior scratch resistance of the coating of the present invention, and the ease of cleaning, make the coating particularly suitable for flooring applications.

As noted, the coating of the present invention has an inherent macroscopic texture. The term "macroscopic texture" is intended to encompass any textural features, regular or irregular, produced on the surface of a coating that are visible to the naked eye. The macroscopic texture may have any design, shape, or pattern on the surface of the coating. This macroscopic texture (not shown in FIG. 1) is provided by the coating 12 and is visible to the naked eye when viewing the coating 12 on the coated substrate 10.

As described above in connection with the pre-cured coating mixture, the macroscopic texture may be provided by different components in the pre-cured coating mixture. In one embodiment of the invention, the macroscopic texture is provided by a pre-cured coating mixture having an effective viscosity capable of providing a macroscopic texture. In another embodiment, the macroscopic texture is provided by a pre-cured coating mixture that comprises texture-producing particles having an effective size to produce a cured coating with the macroscopic texture. In yet another embodiment, the macroscopic texture may be provided by a pre-cured coating mixture having both an effective viscosity and texture-producing particles. Several examples of various coatings made according to various embodiments of the present invention are described below which provide examples of the various macroscopic textures. These examples are intended to provide examples of how a macroscopic texture may be achieved, but are not intended to be limiting as to the types, shapes, or patterns of macroscopic texture that may be obtained.

In addition, it was surprisingly found that the coatings of the present invention with macroscopic texture have superior scratch and abrasion resistance as measured by a Taber scratch test. Scratch test results for various coatings made according to the present invention are described in the examples below.

It should be appreciated that the concentrations of the various non-reactive groups and components in the cured coating are assumed to be the same in the pre-cured coating mixture. As will be described below, the coating of the present invention is made by applying the pre-cured coating mixture to a substrate followed by radiation-curing. Therefore, it is assumed that the concentrations of the various non-reactive groups and components in the pre-cured coating mixture will not change substantially during curing and will remain substantially the same. However, those skilled in the art will recognize that other factors, such as coating application processing conditions, may induce some degree of variability in these concentrations.

Figure 2:
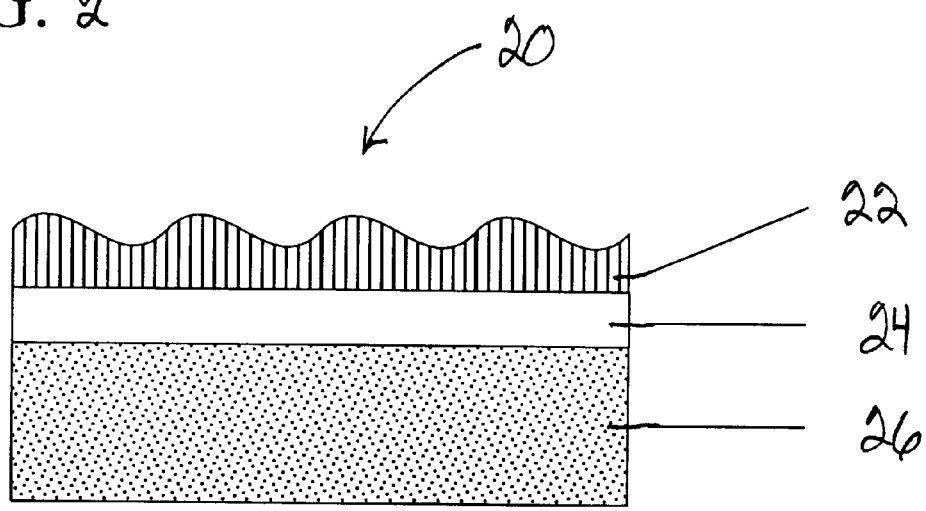
FIG. 2 illustrates a cross-sectional view of a coated substrate according to another embodiment of the present invention.

FIG. 2 illustrates a cross-sectional view of a coated substrate according to another embodiment of the present invention. FIG. 2 shows a coated substrate 20 having a coating 22 on a coated substrate layer 24 and additional substrate layers 26 attached to the coated substrate layer 22 on the side opposite the coating 22. The coating 22 illustrates the macroscopic texture provided by the coating 22. As shown in FIG. 2, it should be appreciated that the macroscopic texture of the coatings made according to the present invention is inherent in, or provided by, the coating itself and is independent of the substrate to which the coating is adhered. Therefore, it should be appreciated that this coating is significantly different from coatings that naturally conform to a substrate having a texture or for cured coatings that are impressed with a pattern.

Figure 3:
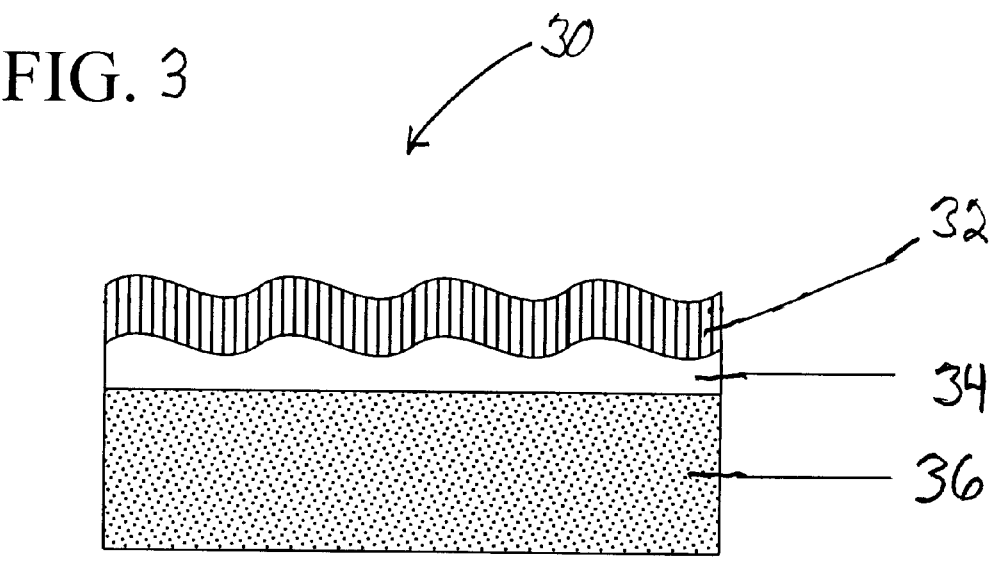
FIG. 3 illustrates a cross-sectional view of a coated substrate according to yet another embodiment of the present invention.

FIG. 3 illustrates a cross-sectional view of a coated substrate according to yet another embodiment of the present invention. FIG. 3 shows a coated substrate 30 having a coating 32 on a coated substrate layer 34 and additional substrate layers 36 attached to the coated substrate layer 32 on the side opposite the coating 32. FIG. 3 illustrates that the coatings of the present invention may also be applied to substrates that already have macroscopic texture themselves due to embossing or some other method. Thus, two or more textures can exist on a given coated substrate, i.e., texture from the coating and texture from the substrate. As illustrated in FIG. 3, the macroscopic texture of the coating 32 may be such that it conforms to the texture of the underlying substrate 34. Alternatively, the macroscopic texture may be applied so that it does not conform to the texture of the underlying substrate.

A preferred embodiment of a cured coating mixture of the present invention is a cured coating made from a pre-cured coating mixture comprising, by weight, 79.44% of a resin mixture comprising, by weight, 53.4% urethane acrylate (ALUA 1001, available from Congoleum Corporation, Mercerville, N.J.), 8.8% ethoxylated diacrylate (SR 259 available from Sartomer, Exton, Pa.), 24.3% propoxylated diacrylate (SR 306 available from Sartomer, Exton, Pa.), 13.4% ethoxylated trimethlyolpropane triacrylate (SR 454 available from Sartomer, Exton, Pa.), and 0.1% acylphosphine oxide (LUCERIN TPO available from BASF); 12.00% flatting agent comprising 5 micron nylon particles (Orgasol 2001 UD available from Elf Atochem, Philadelphia, Pa.); 6.25% texture-producing particles comprising 60 micron nylon 12 particles (ORGASOL 2002 ES 6 available from Elf Atochem, Philadelphia, Pa.); 2.00% nanometer-sized alumina RCA having a particle size distribution in the range of 27–56 nm (NANOTEK ALUMINA #0100 available from Nanophase Technologies Corp. Burr Ridge, Ill.); and 0.31% prehydrolyzed silane as an RCA coupling agent comprising 0.21% 3-methacryloxypropyltrimethoxysilane (Z-6030 available from Dow Corning, Midland, Mich.), 0.015% glacial acetic acid, 0.015% deionized water, and 0.07% ethanol, prehydrolyzed as described in Example 1 below.

Figure 4:
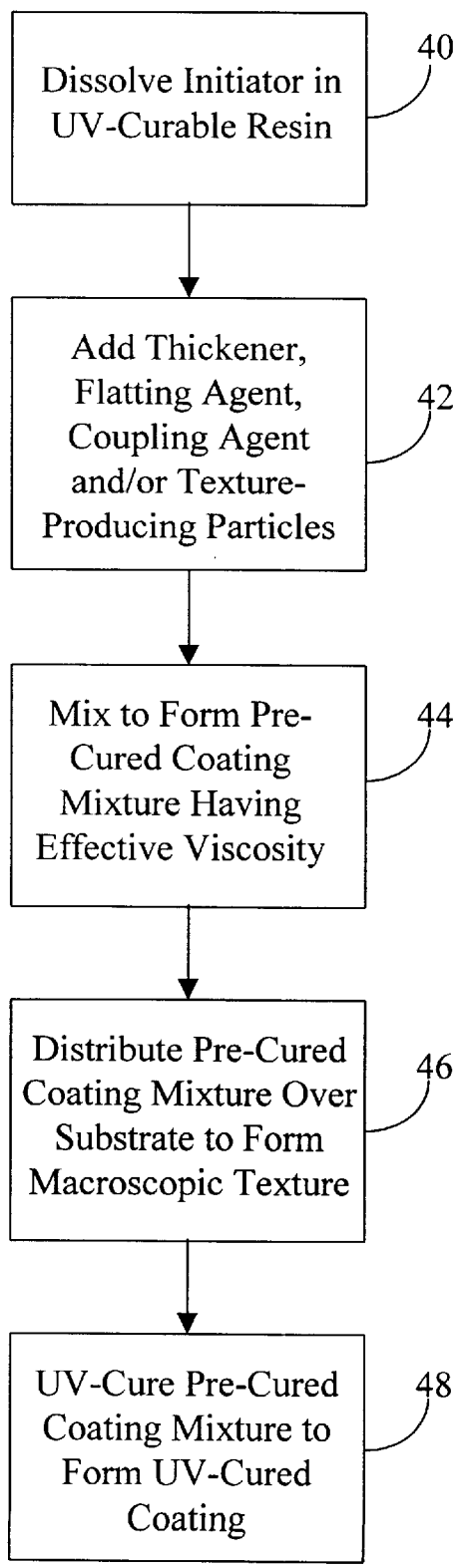
FIG. 4 is a process flow diagram of a process for making a coating according to one embodiment of the present invention.

FIG. 4 is a process flow diagram of a process for making a coating according to one embodiment of the present invention. In the step 40, the initiator is dissolved in the radiation-curable resin. The initiator and the resin may be mixed in any manner typically used in the art such that the initiator is dissolved into the resin phase.

In the step 42, any RCA, coupling agent, flatting agent, or texture-producing particles are added to the mixture produced in the step 40. It should be appreciated that for the RCA, flatting agent, and/or texture-producing particles, a coupling agent may also be used. In this case, the particles and the coupling agent may simply be added to the mixture either simultaneously or sequentially, without the need to pre-treat the particles with the coupling agent before adding these components to the mixture. This avoids the use of a solvent that may create diffusion pathways for staining materials to diffuse through and stain the coating. In some cases, it is desirable to make a concentrated mixture of RCA, coupling agent, flatting agent, and/or texture-producing particles in a liquid medium and dilute it down into the pre-cured coating mixture. This concentrate is called a master batch and is well known in the art.

In the step 44, all of the components are mixed to produce the pre-cured coating mixture. The step 44 may be accomplished using a Cowles blade mixer, ultrasonic probe, or other high shear mixer. It should be appreciated that during mixing the temperature of the mixture should not be allowed to increase significantly. For example, increases in temperature to approximately 100° C. may result in thermal reaction of the resin causing gelation. In cases where an organic solid is used as a RCA, the temperature during mixing should be allowed to increase to a temperature that is adequate to dissolve the organic solid, for example, 70° C. The temperature should then be reduced to ambient temperature, thereby producing a highly viscous pre-cured coating mixture.

In one embodiment of the invention, the pre-cured coating mixture produced in the step 44 must have the necessary viscosity to produce a macroscopic texture upon application and subsequent curing of the pre-cured coating mixture on a substrate. Preferably, the viscosity of the pre-cured coating mixture should be approximately 100,000–1,000,000 cPs at a shear rate of $0.150 \text{ s}^{-1}$ at the application temperature. As will be further discussed below a viscosity that is too low does not provide a macroscopic texture, and a viscosity that is too high results in poor distribution of the pre-cured coating mixture over the substrate surface.

To obtain the requisite viscosity in the pre-cured coating mixture requires the use of the appropriate concentration of the radiation-curable resin. It should be appreciated that the radiation-curable resin may alone be used to provide the requisite viscosity, but that it may be desirable to use a RCA in conjunction with the radiation-curable resin to provide the requisite viscosity. If a RCA is used, then the requisite viscosity will be determined by using the appropriate concentration of both the radiation-curable resin and the RCA. It should be appreciated that in either case, the concentration of these components will be dependent upon the intrinsic properties of each. It should also be appreciated that the addition of other components, such as coupling agents and flatting agents, may also affect the viscosity of the pre-cured coating mixture. Therefore, these other components may also need to be considered in determining the appropriate concentrations of the radiation-curable resin and the RCA, if used.

In the step 46, the pre-cured coating mixture is distributed across the surface of a substrate. The step 46 requires that the pre-cured coating mixture is initially applied to the substrate surface and then distributed across the surface. Application of the pre-cured coating mixture to the surface of the substrate may be accomplished by any means known in the art for placing a high viscosity material onto a substrate. For example, the pre-cured coating mixture may be pumped to the substrate and placed on the substrate using a slot die. It should be appreciated that it may be necessary to heat the pre-cured coating mixture to reduce the viscosity to allow for its placement on the substrate surface; however, it is important that the pre-cured coating mixture be allowed to cool prior to actually distributing it across the substrate surface, so that it has the required viscosity necessary to generate macroscopic texture.

Distributing the pre-cured coating mixture across the substrate surface may be accomplished using any means known in the art; however, it is important that such means are capable of moving a high viscosity material across the surface in a manner that leaves the pre-cured coating mixture in the form of the desired macroscopic texture that will become fixed upon curing. It should be appreciated that it is preferred to uniformly distribute the pre-cured coating across the substrate surface, but such uniform distribution should not be confused with a completely smooth distribution of the pre-cured coating mixture across the substrate surface. After the pre-cured coating mixture has been distributed, the macroscopic texture should be apparent, as it is this texture that will be fixed on the substrate after curing. Therefore, it should be appreciated that, in addition to the use of an effective viscosity and/or texture-producing particles, the macroscopic texture can be altered using different techniques for applying the pre-cured coating mixture to a substrate.

Before discussing specific pre-cured coating application methods, it should be noted that the pre-cured coatings in this embodiment can have a viscosity that is dependent on both the amount of shear applied to the pre-cured coating mixture, as well as the amount of time during and after the application of the shear. This type of behavior is referred to in the art as thixotropic. Thus, the production of texture is dependent on the viscosity of the pre-cured coating under the shear of the application equipment.

One method for distributing the pre-cured coating mixture uniformly across the substrate surface in a manner that produces a desired macroscopic texture is by use of an air knife. The use of an air knife requires that the pre-cured coating mixture has been properly and uniformly applied to the substrate surface to allow the air knife to uniformly distribute the pre-cured coating mixture over the substrate surface. It should be appreciated that the relatively high viscosity of the pre-cured coating mixture at low shear rates allows the air knife to produce a macroscopic texture and prohibits a macroscopically smooth distribution of the pre-cured coating mixture. Thus, the pre-cured coating in this embodiment of the present invention has a high enough viscosity under the shear of the air knife to produce a macroscopic texture and not level into a macroscopically smooth surface. More specifically, the air knife actually generates a wave of pre-cured coating mixture that flows over the substrate surface as it passes by the air knife. This wave leaves behind ripples that are the macroscopic texture.

It should be appreciated that the operating parameters of the air knife can be changed to produce varying macroscopic textures. These parameters include the line speed, air pressure, angle of attack, and the gap between the substrate and the air knife. Therefore, different macroscopic textures providing a variety of aesthetic looks may be produced. It can now be appreciated that one method for determining whether the pre-cured coating mixture has the appropriate viscosity is by distributing the pre-cured coating mixture on the desired substrate using an air knife. If the viscosity of the pre-cured coating under the shear of the air knife is too low, the coating will level and produce a macroscopically smooth surface. If the viscosity under shear is too high, the pre-cured coating mixture will be blown off the substrate resulting in an incompletely or uncoated substrate.

Another method for distributing the pre-cured coating mixture uniformly across the substrate surface in a manner that produces a desired macroscopic texture is by use of a roll coater. The roll coater both applies and coats the pre-cured coating mixture to the substrate. The texture is generated by the roller being in direct contact with the coating on the substrate. As the substrate passes under the roller, the roller passes away from the substrate pulling or splitting some of the pre-cured coating from the substrate. This splitting results in macroscopic texture that can be varied with the roll coater operating parameters including line speed, gap between the roller and the substrate, roller material type, roller speed relative to the line speed and roller diameter.

In the step 48 the pre-cured coating mixture that has been distributed over the substrate surface and is in the form of the desired macroscopic texture is cured using radiation. This curing step acts to polymerize the pre-cured coating mixture to fix the macroscopic texture in place and adhere it to the substrate surface, thereby producing a radiation-cured coating on the substrate. The step 48 may be conducted under conditions typical of radiation-curing processes depending upon the particular radiation-curable resin and initiator used. For example, the step 48 may be conducted using radiation lamps in an inert atmosphere. It should be appreciated that if a matte finish is desired, the radiation lamps can be used in an ambient atmosphere followed by an inert atmosphere. Thus, a matte finish can be superimposed on the macroscopic texture if a flatting agent is used.

In another embodiment of the invention, the pre-cured coating mixture utilizes texture-producing particles to produce the macroscopic texture of the coating. These texture-producing particles may be added to the pre-cured coating mixture in the step 42. These are mixed in the same manner as the previous embodiment, but the effective viscosity of the pre-cured coating can be much lower, typically 50–5000 cPs at a shear rate of $0.150$ $s^{-1}$ at the application temperature, as the macroscopic texture is provided by the texture-producing particles and not necessarily the viscosity of the pre-cured coating mixture. It should be appreciated, however, that these texture-producing particles can be used in combination with a pre-cured coating mixture that does have an effective viscosity as well. The pre-cured coating mixture containing these texture-producing particles is then processed in a similar manner using the steps 44, 46, and 48. Specifically, this pre-cured coating mixture can be mixed in a similar manner as described above in the step 44. This pre-cured coating mixture may be applied and coated on a substrate in the step 46 using methods known in the art, including the use of an air knife or roll coater. Lastly, this pre-cured coating mixture may be cured in a similar manner as described above in the step 48.

The invention having been described, the following examples illustrate various embodiments and features of the present invention. It should be appreciated that the following examples are presented to illustrate, rather than to limit, the scope of the invention.

EXAMPLE 1

This example describes a microscopic texture with good abrasion resistance, but poor cleanability. 60 g of alumina (available as NANOTEK ALUMINA 0100 from Nanophase Technologies Corp., Burr Ridge, Ill.) having an average particle diameter range of 27–56 nm, 7.92 g of prehydrolyzed 3-methacryloxypropyltrimethoxysilane (available as Z-6030 from Dow Corning, Midland, Mich.), 240 g of a UV-curable resin (see Table 1 below for the resin composition), and about 200 g of 0.5 in. diameter porcelain balls were added to a porcelain media mill.

The mixture was ball milled for about 6 hours at room temperature. The pre-cured coating mixture, after removal of the grinding media, was applied using a 1.5 mil draw bar to rigid polyvinyl chloride floor tile substrates at room temperature. The tile substrates were then UV-cured in a two step process. First, the tile substrates were UV-cured in air using a line speed of 100 feet per minute (fpm) under two H-bulb (mercury) lamps on high. Then the tile substrates were UV-cured in nitrogen (<500 ppm oxygen) using two H-bulbs set on low and a line speed of 20 fpm. The coated tiles were subjected to this latter inert UV-curing step a second time. The resulting coatings were transparent with an extremely low gloss of 6% (at 60°). Scanning Electron Microscopy (SEM) images of this coating indicate that microscopic wrinkling was present, i.e., micro-wrinkling. A Taber scratch test consisting of scribing 5 concentric circles on the coated samples with a metal stylus weighted from 300 to 500 g in 50 g increments yielded no visible scratches on the coating surface. A qualitative scratch rating system was used to evaluate the scratches from the test (i.e., a 0–7 scale was used, where 7 is the best in that there are no visible scratches), and this coating was rated 7. When this coating was exposed to heavy traffic areas, it picked up dirt particles quite easily and was very difficult to clean.

TABLE 1

UV-Curable Resin Composition

| Component | Manufacturer | Wt % |
| --- | --- | --- |
| Urethane acrylate (ALUA 1001) | Congoleum (Mercerville, NJ) | 53.4 |
| Ethoxylated diacrylate (SR 259) | Sartomer (Exton, PA) | 8.8 |
| Propoxylated diacrylate (SR 306) | Sartomer (Exton, PA) | 24.2 |
| Ethoxylated trimethylolpropane triacrylate (SR 454) | Sartomer (Exton, PA) | 13.3 |
| Surfactant (DC 193) | DOW Corning (Midland, MI) | 0.1 |
| Acylphosphine oxide (LUCERIN TPO) | BASF | 0.2 |

As noted above, prehydrolyzed silane was used. The silane (Z-6030) was prehydrolyzed to make it more reactive with the surface of the nanometer-sized alumina. The prehydrolysis was conducted by first mixing at room temperature 5 g of glacial acetic acid, 5 g of deionized water, and 25 g of ethyl alcohol. Then, 75 g of Z-6030 were added to the mixture. The mixture was gently agitated for about 24 hours. The mixture was allowed to stand several days before use.

EXAMPLE 2

This example shows a coating with macroscopic texture having good cleanability and scratch resistance. 31.17 g of silica (available as NANOTEK SILICA 2000 from Nanophase Technologies Corp., Burr Ridge, Ill.) having an average particle diameter range of 15–33 nm, 10.51 g of prehydrolyzed 3-methacryloxypropyltrimethoxysilane (available as Z-6030 from Dow Corning, Midland, Mich.) prepared as described in Example 1, 100 g of a UV-curable resin (see Table 2 below for resin composition). The mixture was hand stirred with a wooden spatula and then mixed with an ultrasonic probe for about 20 minutes. The pre-cured coating mixture was applied to flexible polyvinyl chloride floor substrates at room temperature with a spatula and distributed on the substrate with an air knife. These sheet vinyl substrates were then UV-cured under nitrogen (<500 ppm oxygen) using two H-bulbs set on high and a line speed of 100 fpm. Two passes under the lamps were made under these conditions. The resulting coating was transparent with a gloss value (at 60°) of about 11%. The coating also had a macroscopic wave-like texture and was found to be cleanable. A Taber scratch test consisting of scribing 5 concentric circles on the coated samples with a metal stylus weighted from 300 to 500 g in 50 g increments yielded no visible scratches on the coating surface. Using the qualitative scratch rating system, this coating was rated a 7.

TABLE 2

UV-Curable Resin Composition

| Component | Manufacturer | Wt % |
|---|---|---|
| Urethane acrylate (ALUA 1001) | Congoleum (Mercerville, NJ) | 53.4 |
| Ethoxylated diacrylate (SR 259) | Sartomer (Exton, PA) | 8.8 |
| Propoxylated diacrylate (SR 306) | Sartomer (Exton, PA) | 24.2 |
| Ethoxylated trimethylolpropane triacrylate (SR 454) | Sartomer (Exton, PA) | 13.3 |
| Surfactant (DC 193) | DOW Corning (Midland, MI) | 0.1 |
| Acylphosphine oxide (LUCERIN TPO) | BASF | 0.2 |

EXAMPLE 3

To show the benefits of using nanometer-sized alumina in a coating according to the present invention, a coating was made using larger alumina particles. 60 g of alumina (available as A152-SG from Alcoa, Pittsburgh, Pa.) having an average particle diameter of 1.5 $\mu$m, 0.48 g prehydrolyzed silane (Z-6030), 240 g of the resin used in Example 1, and about 200 g of 0.5 in. porcelain balls were added to a ball mill and milled as in Example 1. This pre-cured coating mixture was applied, cured, and tested for scratch resistance as given in Example 1. The resulting coating was visually not as transparent as the coating in Example 1 and was given a scratch rating of 2 indicating visual scratches were present.

EXAMPLE 4

Tests were conducted to determine the effects of silane as a coupling agent on the dispersion of nanometer-sized alumina. 2 g of NANOTEK ALUMINA 0100 having an average particle diameter range of 27–56 nm was added to log of each of the following liquids: ethoxylated diacrylate (available as SR 259 from Sartomer, Exton, Pa.), propoxylated diacrylate (available as SR 306 from Sartomer, Exton, Pa.), ethoxylated trimethlolpropane triacrylate (available as SR 454 from Sartomer, Exton, Pa.), and urethane acrylate (available as ALUA 1001 from Congoleum, Mercerville, N.J.). The mixtures were stirred, shaken, and then placed into an ultrasonic bath for 30 minutes. To some of these mixtures 0.24 g prehydrolyzed silane, as prepared in Example 1, was added, and the mixture was stirred. The consistencies of each of these mixtures are described in the Table 3 below.

TABLE 3

Effects of Prehydrolyzed Silane

| Liquid | Dispersing Agent | Observations |
|---|---|---|
| SR 306 | none | thixotropic paste |
| | silane | low viscosity liquid |
| SR 259 | none | low viscosity liquid |
| | silane | low viscosity liquid |
| SR 454 | none | thixotropic paste |
| | silane | low viscosity liquid |
| ALUA 1001 | none | non-thixotropic cream |
| | silane | low viscosity liquid |

The observations show that the urethane acrylate and the Ethoxylated diacrylate disperse the nanometer-sized alumina better than the propoxylated diacrylate and the Ethoxylated trimethlolpropane triacrylate. These observations also show that the addition of the prehydrolyzed silane dispersing agent improves the dispersion of the nanometer-sized alumina.

EXAMPLE 5

This example shows the effects of alumina size and coupling agent on the clarity of the cured coating. The pre-cured coating mixture in Example 1 was prepared in the identical manner described with the following exception: the prehydrolyzed silane was prepared using 75 g of ethanol instead of 75 g of Z-6030 silane. Thus, this pre-cured coating mixture contained no coupling agent. This pre-cured coating mixture (referred to as Example 5), the pre-cured coating mixture in Example 1, and the pre-cured coating mixture in Example 3 were applied at room temperature using a 3 mil draw-down bar to glass substrates. The drawn down pre-cured coating mixtures were then cured using two curing conditions as described in Table 4.

TABLE 4

UV-Curing Conditions

| Condition | Parameters |
|---|---|
| 1 | atmosphere = air |
| | line speed = 100 feet per minute (fpm) |
| | lamp = 2 H-bulb (mercury) lamps on high |
| | passes = 1 |
| | atmosphere = nitrogen (<500 ppm oxygen) |
| | line speed = 20 fpm |
| | lamp = 2 H-bulb lamps on low |
| | passes = 2 |
| 2 | atmosphere = nitrogen |
| | line speed = 20 fpm |
| | lamp = 2 H-bulb lamps on low |
| | passes = 2 |

The percent haze is defined as follows:

% haze=(100−% specular transmission)/% total transmission and was determined for these cured coatings using a CHROMA SENSOR CS-5 from Applied Color Systems, Inc. and a method similar to ASTM D 1003-92. The thicknesses of the detached coatings were determined with a MADAKE micrometer. The haze and thickness values are given in Table 5 below.

TABLE 5

Coating Thickness and Haze Results

| Coating | Cure Conditions | Thickness (mil) | % Haze |
|---|---|---|---|
| Example 1 (20% nano-sized alumina) | 1 | 2.6 | 59.3 |
| Example 1 (20% nano-sized alumina) | 2 | 2.6 | 67.3 |
| Example 3 (20% micron-sized alumina) | 1 | 3.2 | 99.4 |
| Example 3 (20% micron-sized alumina) | 2 | 3.2 | 99.4 |
| Example 5 (20% nano-sized alumina, no silane) | 1 | 1.7 | 82.0 |
| Example 5 (20% nano-sized alumina, no silane) | 2 | 6.3 | 97.8 |

The percent haze values show that the coating with nanometer-sized alumina as much less hazy than the coating containing micron-sized alumina regardless of cure conditions. The data also show that the silane coupling agent improves the clarity of the coatings containing nanometer-sized alumina.

EXAMPLE 6

This example shows the effects of inorganic particle type and loading on the cured coating texture. Six pre-cured coating mixtures were prepared where the inorganic nanoparticles and the prehydrolyzed silane (as described in Example 1) were added to the UV-curable organic phase used in Example 2. Each pre-cured coating mixture was mixed with a Cowles blade and then an ultrasonic probe. The composition of these pre-cured coating mixtures is shown in Table 6.

TABLE 6

Pre-Cured Coating Mixture Compositions

| Pre-Cured Coating Mixture | Nanometer-Sized Particle | Wt %/Vol % | Wt % Prehydrolyzed Silane | Photoinitiator (%) |
|---|---|---|---|---|
| 1 | None | 0/0 | 0 | 0.1 |
| 2 | $Al_2O_3$ | 19.5/6.0 | 1.8 | 0.1 |
| 3 | $Al_2O_3$ | 28.9/10 | 2.6 | 0.1 |
| 4 | $Al_2O_3$ | 40/15.4 | 3.6 | 0.2 |
| 5 | $SiO_2$ | 11/5.5 | 2.5 | 0.1 |
| 6 | $SiO_2$ | 16/8.3 | 3.7 | 0.2 |
| 7 | $SiO_2$ | 22/11.8 | 5.1 | 0.2 |

These pre-cured coating mixtures were then applied to flexible vinyl flooring substrates which were cleaned with a solution of acetic acid, soap, and water. The pre-cured coating mixtures were applied at room temperature using a pipette or a spatula depending on the viscosity, and then the samples were passed through an air knife to distribute the pre-cured coating mixture over the substrate and to remove any excess. The resultant films were then cured under UV lamps using different lamp intensities and atmospheres as described in Table 7 below. Scanning electron microscopy (SEM) images of the coatings were taken along with gloss measurements at 60°.

TABLE 7

Gloss and Texture Measurements

| Coating | Cure Conditions | Gloss (%) | Texture (SEM/visual) |
|---|---|---|---|
| 1 | $N_2$ - 100 fpm, 2 lamps high, 2 passes | 80 | smooth |
|   | Air - 100 fpm, 2 lamps high | 6 | long micro-wrinkles |
|   | $N_2$ - 100 fpm, 2 lamps high, 2 passes | | |
| 2 | $N_2$ - 100 fpm, 2 lamps high, 2 passes | 80 | smooth |
|   | Air - 100 fpm, 2 lamps high | 4 | short micro-wrinkles |
|   | $N_2$ - 100 fpm, 2 lamps high, 2 passes | | |
| 3 | $N_2$ - 100 fpm, 2 lamps high, 2 passes | 60 | some macro texture |
|   | Air - 100 fpm, 2 lamps high | 30 | very short micro-wrinkles |
|   | $N_2$ - 100 fpm, 2 lamps high, 2 passes | | |
| 4 | $N_2$ - 100 fpm, 2 lamp high, 2 passes | 30 | macro texture |
|   | Air - 100 fpm, 2 lamps high | 30 | macro texture |
|   | $N_2$ - 100 fpm, 2 lamps high, 2 passes | | |
| 5 | $N_2$ - 100 fpm, 2 lamp high, 2 passes | 20 | macro texture |
|   | Air - 100 fpm, 2 lamps high | 5 | macro texture and micro-wrinkles |
|   | $N_2$ - 100 fpm, 2 lamps high, 2 passes | | |
| 6 | $N_2$ - 100 fpm, 2 lamps high, 2 passes | 17 | macro texture |
|   | Air - 100 fpm, 2 lamps high | 16 | macro texture |
|   | $N_2$ - 100 fpm, 2 lamps high, 2 passes | | |
| 7 | $N_2$ - 100 fpm, 2 lamp high, 2 passes | 6 | macro texture |
|   | Air - 100 fpm, 2 lamps high | 6 | macro texture |
|   | $N_2$ - 100 fpm, 2 lamp 2 high, 2 passes | | |

Coatings cured under both air and inert atmospheres having 30% or less nanometer-sized alumina showed micro-sized wrinkles, which looked like spaghetti in the SEM images (200×). As the concentration of alumina is increased from 0 to 20%, the length of the wrinkles decreases under inert ($N_2$) curing conditions. At 30% alumina, the wrinkle length is quite small resulting in a surface resembling a golf ball surface in the SEM images. At 40% alumina, the micro-wrinkling is not observed in the SEM (surface is smooth), but a macro wave-like texture is observed with the naked eye. Wave-like macro texture is also observed with the coatings having 16% and 22% silica. In the cases where micro-wrinkling is not observed, the macro texture observed is independent of the cure conditions (two zone versus one zone) used.

EXAMPLE 7

This example demonstrates that wave-like macroscopic texture is generated by the coating application method. Pre-cured coating mixture 5 in Example 6 above was applied to a substrate with an air knife as in Example 6. The same pre-cured coating mixture was also applied to a second substrate with a 1.5 mil draw down bar. Both samples were cured in the inert atmosphere as described in Example 6. The sample coated with a draw bar had a visibly smooth surface and a gloss of 74% compared to a wave-like visible texture with a gloss of 20% for the sample coated with an air knife.

EXAMPLE 8

Figure 5:
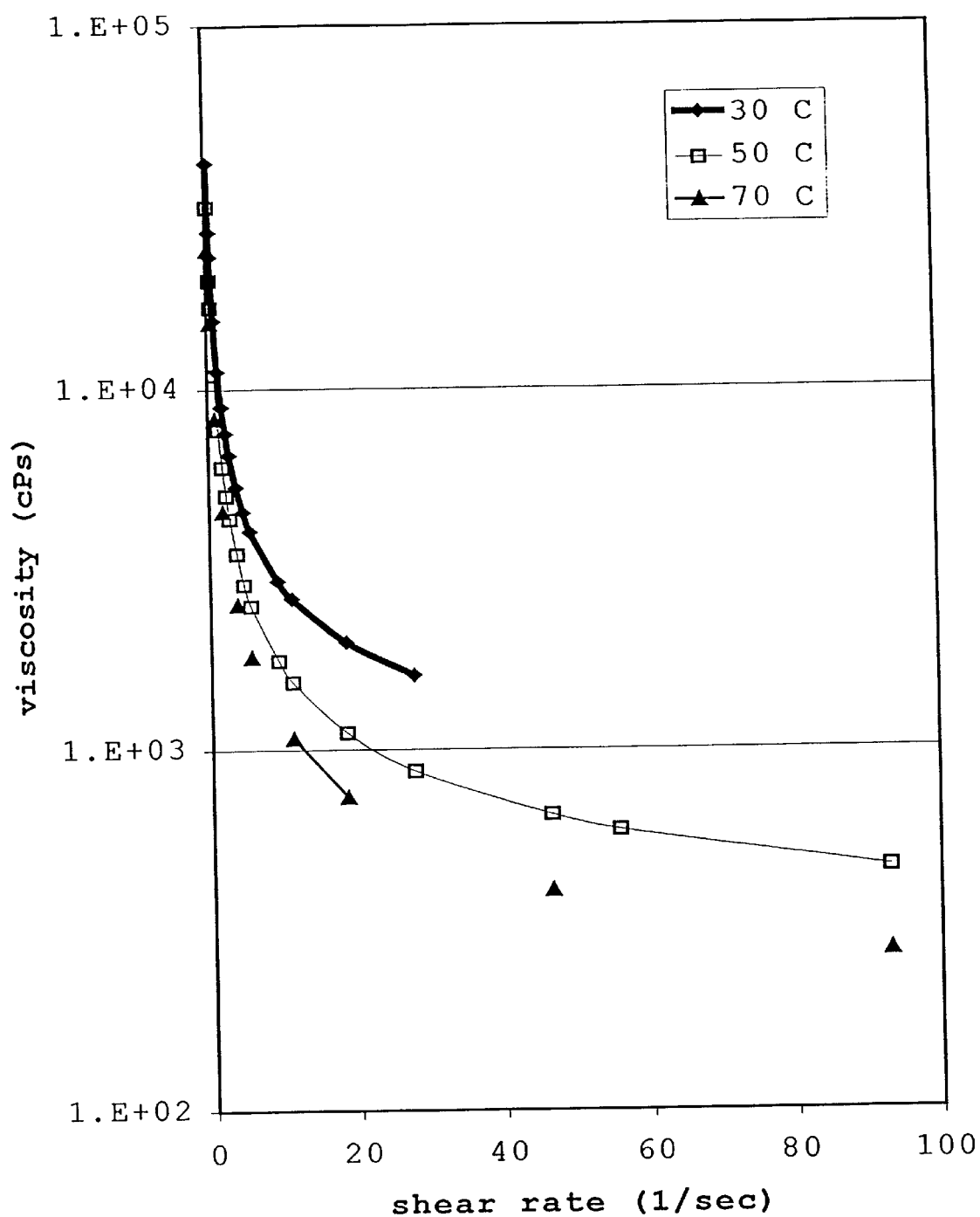
FIG. 5 is a graph of the viscosity as a function of the shear rate for a pre-cured coating mixture made according to one embodiment of the present invention.
Figure 6:
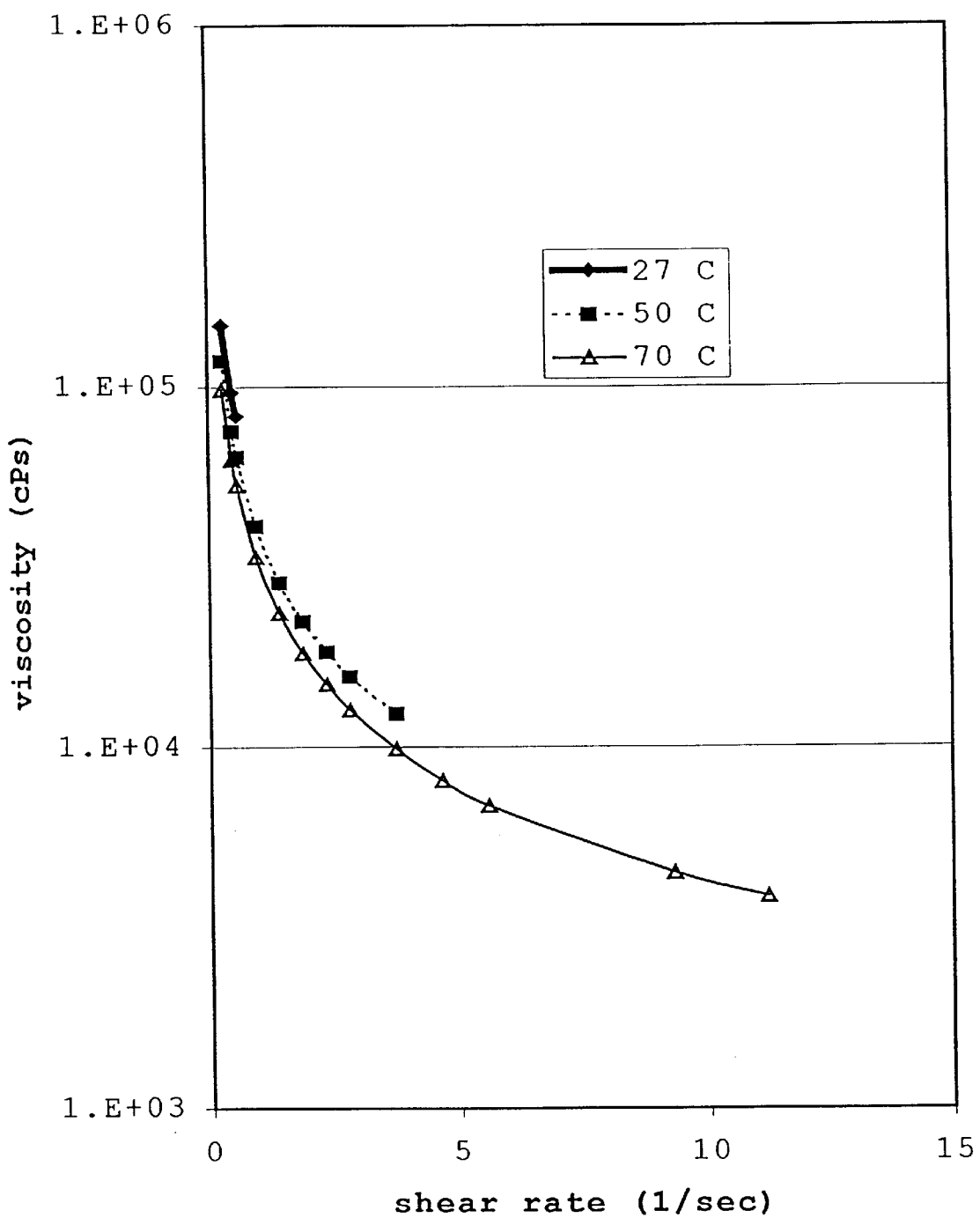
FIG. 6 is a graph of the viscosity as a function of the shear rate for a pre-cured coating mixture made according to another embodiment of the present invention.

This example shows the effect of shear rate and temperature on the pre-cured coating viscosity. The viscosities of pre-cured coating mixtures 3 (28.9% alumina) and 4 (40% alumina) from Example 6 were measured using a Brookfield viscometer (model DV-II, RV) with spindles 21 and 29 as a function of spindle rotation rate (related to shear rate) and temperature. FIG. 5 shows the results of these measurements for pre-cured coating mixture 3 and FIG. 6 shows the results for pre-cured coating mixture 4. The data show that the pre-cured coating mixture viscosity decreases with temperature and shear rate. The viscosity dependence with shear rate indicates that the actual viscosity of the pre-cured coating during application with an air knife is probably less than when measured at low shear (0.150 s$^{-1}$) by the Brookfield, since the shear rate under the air knife is assumed to be greater than 0.150 s$^{-1}$. The viscosity dependence on temperature demonstrates the importance of keeping the pre-cured coating at the required temperature during application, since too high of a temperature may result in a coating that does not produce macroscopic texture because the viscosity is too low. The difference in the curves between FIGS. 5 and 6 show that the amount of RCA in the pre-cured coating influences the coating rheology, which could control the type and degree of texture in the cured coating.

EXAMPLE 9

This example shows the effects of pre-cured coating viscosity on cured coating texture. Using the pre-cured UV resin described in Table 2, 20%, 22.5%, 25%, 27.5%, and 30% nanometer sized alumina (as described in Example 1) was added and mixed with a Cowles blade mixer. Additionally 45% of nanometer-sized calcium carbonate was added to the resin described in Table 2 and mixed with a Cowles blade mixer. The viscosities of these pre-cured coatings were measured as described in Example 8 and are given in Table 8. These pre-cured coatings were then applied to flexible sheet vinyl substrates and coated with an air knife at room temperature. In the case of the coating with 45% calcium carbonate, the pre-cured coating simply blew off the substrate when the air knife was used. The samples were cured under inert conditions and tested for scratch resistance (Taber) and the gloss was determined. These data are also given in Table 8.

TABLE 8

Pre-Cured Coating Viscosity Effects on Cured Coating Properties

| Coating | Viscosity (cPs) at 0.150 s$^{-1}$ at Room Temperature | Gloss (%) | Macroscopic Texture | Scratch (Taber) |
|---|---|---|---|---|
| 20% alumina | 30,000 | 46 | none | some visible |
| 22.5% | 56,667 | 37 | very slight | some visible |
| 25% | 110,000 | 25 | yes | some visible |
| 27% | 173,000 | 19 | yes | some visible |
| 30% | 408,000 | 9 | yes, most aggressive | none visible |
| 45% calcium carbonate | 1,230,000 | n/a | n/a | n/a |

These data indicate that for the air knife conditions presently used, the viscosity of the coating needs to be approximately in the range of 100,000–1,000,000 cPs measured at room temperature (at a shear rate of 0.150 s$^{-1}$) in order to generate macroscopic texture. The data also indicate that more aggressive texture yields better scratch resistance.

EXAMPLE 10

Figure 7:
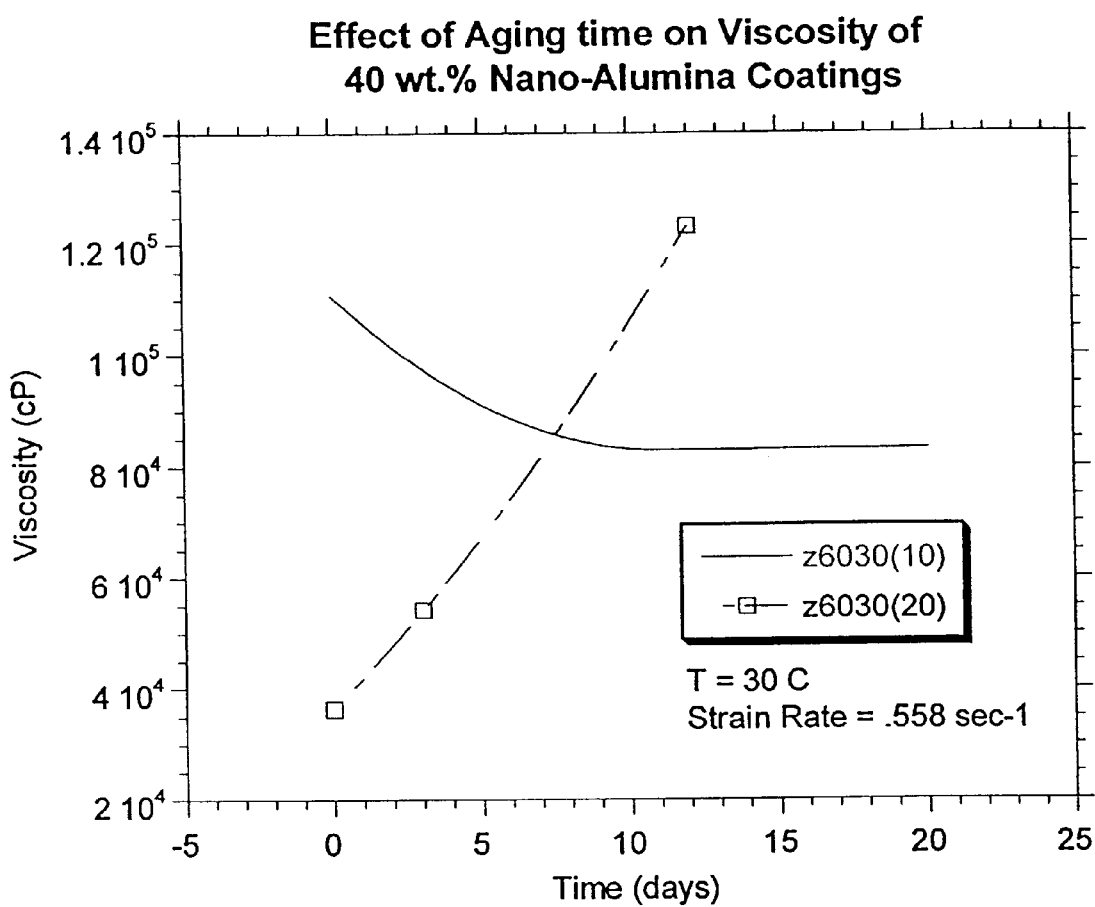
FIG. 7 is a graph of the viscosity as a function of time for a pre-cured coating mixture made according to one embodiment of the present invention.

This example shows the effect of aging and prehydrolyzed silane concentration on the pre-cured coating viscosity. The viscosity of pre-cured coating mixture 4 in Example 6 (40% alumina) was determined as a function of time. These results are shown in FIG. 7. The pre-cured coating mixture viscosity was found to have an aging effect in which fresh samples change viscosity over a period of about one week before leveling at a new viscosity. Specifically, pre-cured coating mixtures prepared with the optimal prehydrolyzed silane concentration (10 $\mu$mol/m$^2$) decrease about 25% in viscosity after 10 days and change color from a dark gray to a lighter gray, whereas pre-cured coating mixtures with 20 $\mu$mol/m$^2$ increase in viscosity by more than 4 times (i.e., the initial value was 75% lower than final value) in the same time period. This behavior suggests that at and below the optimal prehydrolyzed silane concentration the prehydrolyzed silane is continuing to further disperse the alumina particles as the prehydrolyzed silane molecules diffuse slowly to their final equilibrium locations on the particle surfaces and react with Al—OH groups. Conversely, when excess prehydrolyzed silane is present the equilibrium favors reagglomeration and crosslinking by prehydrolyzed silane condensation but is apparently kinetically limited prior to equilibration. Both processes seem to involve rather slow kinetic and/or diffusive steps and are unlikely to be affected much by additional mechanical mixing.

EXAMPLE 11

The effect on pre-cured coating viscosity of the concentration of prehydrolyzed silane coupling agent (as prepared in Example 1) was determined by measuring the viscosity as in Example 8 of a pre-cured coating mixture containing 40% nanometer-sized alumina (e.g., the pre-cured coating mixture 4 in Example 6 except the silane level was varied). The amount of prehydrolyzed silane used in all the examples was calculated using the following equation:

$$M_{ps} = (10^{-6} MW_{ps} a\, s_{np} m_{np})/C_{ps}$$

where $M_{ps}$ is the mass of prehydrolyzed Z-6030 (in g), a is the number of active sites on the nano-particle (in $\mu$mole/m$^2$), $MW_{ps}$ is the molecular weight of the prehydrolyzed Z-6030 (234 g/mol), $s_{np}$ is the nanometer-sized particle surface area (in m$^2$/g), $m_{np}$ is the mass of nanometer-sized particles used in the formulation (in g), and $C_{ps}$ is the weight fraction of prehydrolyzed silane in the solution (from Example 1, typically 0.6818). Based on Parker et al., Mat. Res. Symp. Proc. 249 (1992) 273, 10 $\mu$m of active sites/m$^2$ of inorganic in all of the samples was used, because it should give the lowest pre-cured coating mixture viscosity and, hence, the best dispersion of the nanometer-sized particles. However, it should be appreciated that by controlling the amount of prehydrolyzed silane (more or less than 10 $\mu$mole/m$^2$) can result in different shear dependent rheology, which in turn could lead to different textures.

Figure 8:
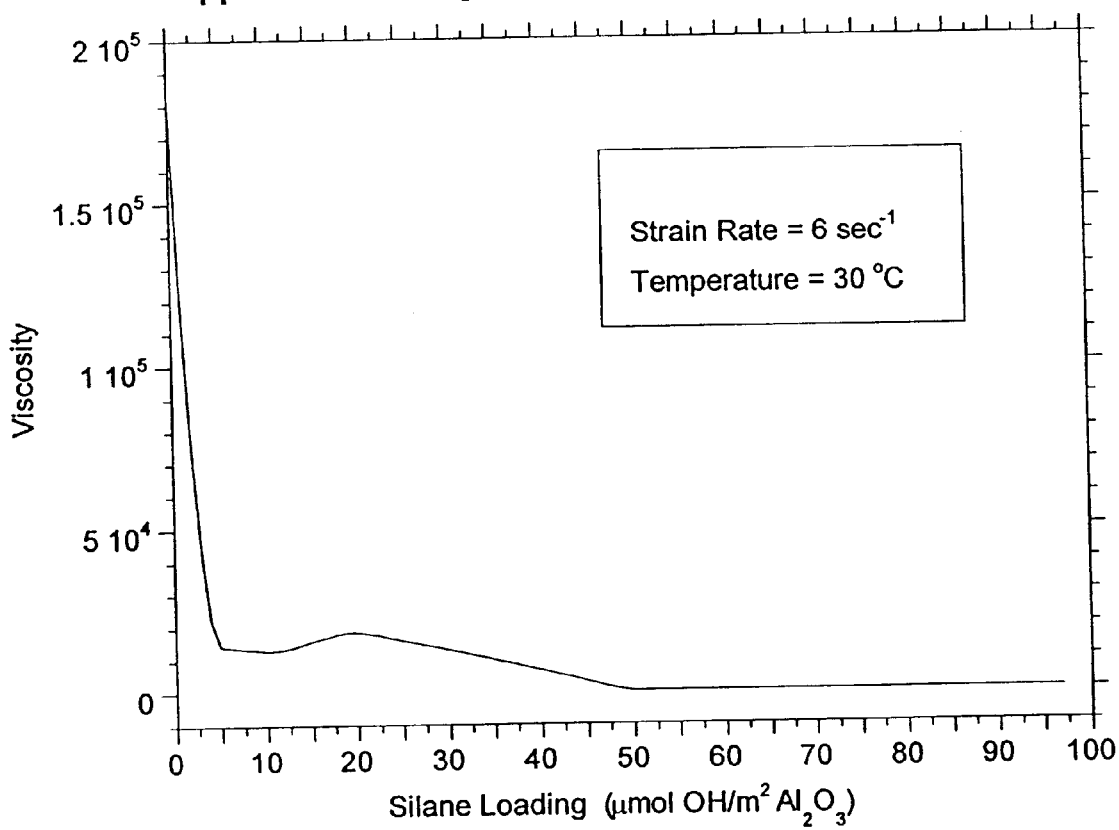
FIG. 8 is a graph of the viscosity as a function of the silane concentration in a pre-cured coating mixture made according to one embodiment of the present invention.

The pre-cured coating mixture viscosity was measured as a function of prehydrolyzed silane level (represented by the "a" value as described above) and the results are shown in FIG. 8. These data show that at a given strain rate, the pre-cured coating mixture equilibrium viscosity was found to initially decrease as the silane concentration was increased, presumably due to enhanced dispersion of the nanometer-sized particles in the resin phase. A viscosity minimum was reached at approximately 10 $\mu$mol silane/m$^2$ Al$_2$O$_3$ and serves as a measure of optimal dispersion for this surfactant-inorganic-resin mixture (in agreement with sedimentation results obtained by Parker et al. for the n-octyltriethoxysilane-toluene-5 $\mu$m, Al$_2$O$_3$ system). The increase in viscosity observed at slightly higher silane concentrations corresponds to some reagglomeration of alumina particles as the excess silane form is larger organophobic phase domains (domains that include both the alumina particles and the hydrophilic ends of the silane molecules) that minimize surface energies between phases. Finally, viscosity again decreases at much higher silane concentrations due to simple mixing-rule behavior.

EXAMPLE 12

This example demonstrates the use of an organic RCA. 20 g of an organic (castor wax derivative) RCA THIXIN R (Rheox Inc., Hightstown, N.J.) was added to 480 g of the pre-cured UV resin described in Table 2 and mixed with a Cowles blade mixer. The mixture was then heated at 70° C. until the THIXCIN R dissolved. The mixture was then allowed to cool to room temperature. The viscosity of this mixture at a shear rate of $0.150 \text{ s}^{-1}$ at room temperature was 243,000 cPs. This mixture was then coated on flexible sheet vinyl using an air knife and cured under inert conditions. The resulting cured coating was transparent and had a wave-like macroscopic texture. When scratched using the Taber scratch test, no visible scratches were observed.

EXAMPLE 13

This example demonstrates the use of both an organic RCA and an inorganic flatting agent. 12 g of TRIXCIN R organic RCA and 19.14 g of ACEMATfE OK 412 (Degussa Corp.) silica flatting agent were added to 288 g of the pre-cured UV resin described in Table 2 and mixed as in Example 12. This mixture was coated on a flexible vinyl sheet floor with an air knife and cured under both atmospheric and inert conditions. The resulting coating had a matte finish and wave-like texture.

EXAMPLE 14

This example shows that wave-like macroscopic texture can be generated without the use of an RCA. 85.25 g of Alua 2302 and 21.31 g ALUA 1001 urethane acrylate oligomers (Congoleum Corp., Mercerville, N.J.), 66.14 g of ACTILANE 424 and 26.64 g of ACTILANE 430 acrylate monomers (Akcros Chemicals, New Brunswick, N.J.), 0.2 g DC 193 surfactant, and 0.394 g of LUCERIN TPO photoinitiator were added to a container at room temperature. This mixture was heated to 70° C. and mixed with a Cowles blade mixer. After cooling to room temperature, the pre-cured coating mixture was applied to flexible vinyl substrates, coated with an air knife, and UV-cured under inert conditions. The resulting coating was transparent and had macroscopic wave-like texture.

EXAMPLE 15

This example demonstrates the use of organic texture-producing particles and an inorganic flatting agent. 6.25 g of ORGASOL 2002 ES 6 NAT (Elf Atochem, Philadelphia, Pa.) polyamide 12 texture-producing particle (60 µm in diameter) and 5.625 g of ACEMATTE OK 412 flatting agent (3 µm diameter) were added to 88.125 g of the pre-cured UV-resin described in Table 2 and mixed with a Cowles blade mixer. This mixture was heated to 70° C. and coated on a flexible sheet vinyl floor using an air knife. The pre-cured coating was cured at a line speed of 100 fpm using atmospheric and then inert conditions. The resulting coating was transparent coating with a matte finish and sandpaper-like texture.

EXAMPLE 16

Figures 9, 10:
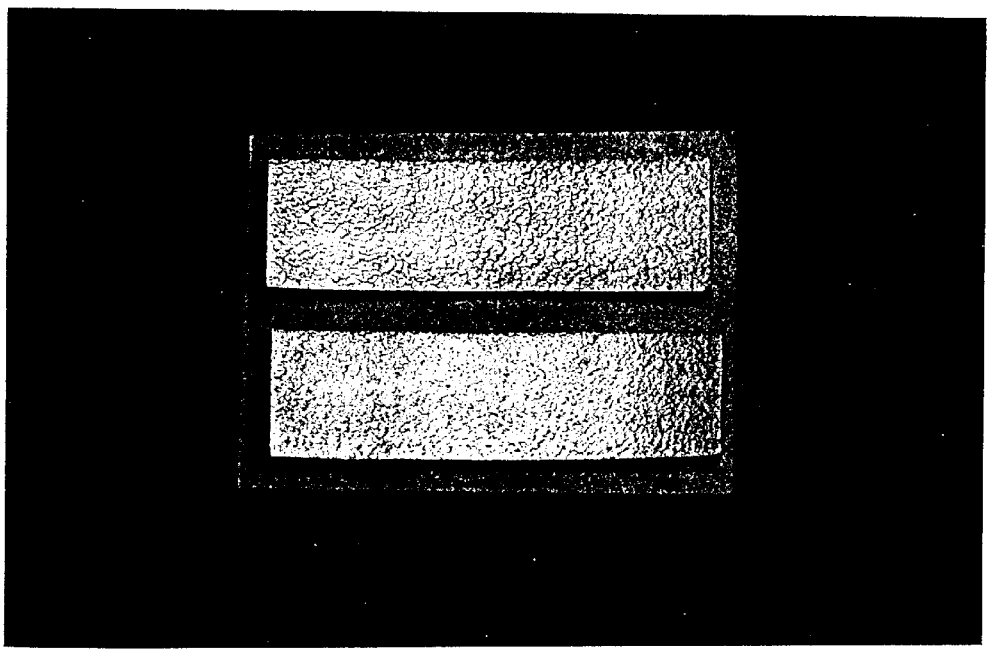
FIG. 9 is a photograph of the top of a portion of the coated substrate produced according to one embodiment of the present invention.
FIG. 10 is a photograph of the top of a portion of the coated substrate produced according to another embodiment of the present invention.
Figures 14, 15, 16, 17, 18:
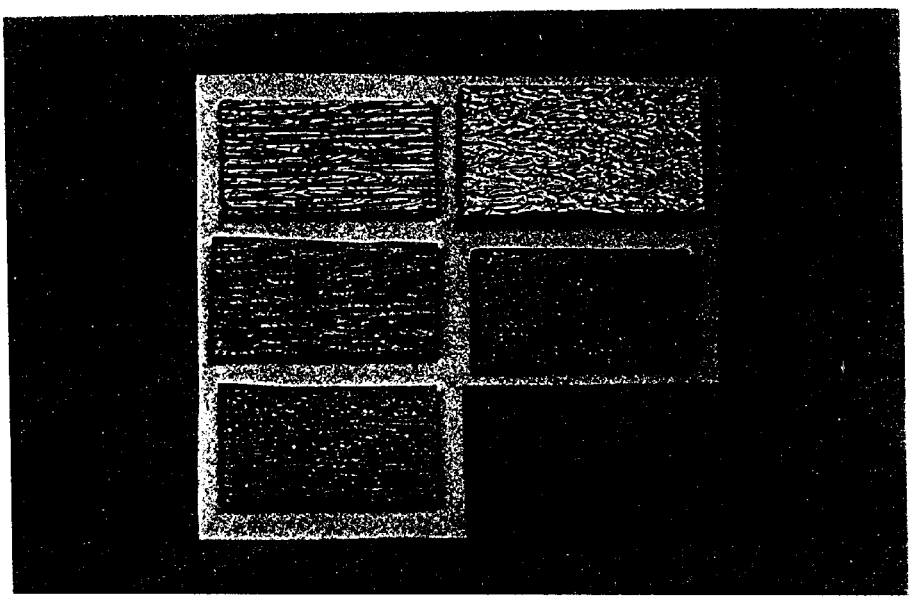
FIG. 14 is a photograph of the top of a portion of the coated substrate produced according to another embodiment of the present invention.
FIG. 15 is a photograph; of the top of a portion of the coated substrate produced according to another embodiment of the present invention.
FIG. 16 is a photograph of the top of a portion of the coated substrate produced according to another embodiment of the present invention.
FIG. 17 is a photograph of the top of a portion of the coated substrate produced according to another embodiment of the present invention.
FIG. 18 is a photograph of the top of a portion of the coated substrate produced according to another embodiment of the present invention.
Figure 19:
FIG. 19 is an illustration of the coated texture of FIG. 14.
Figure 20:
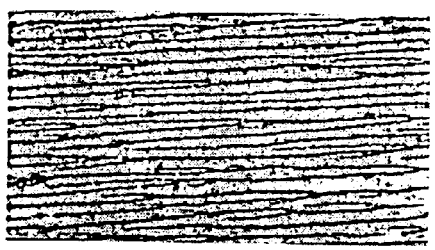
FIG. 20 is an illustration of the coated texture of FIG. 15.
Figure 21:
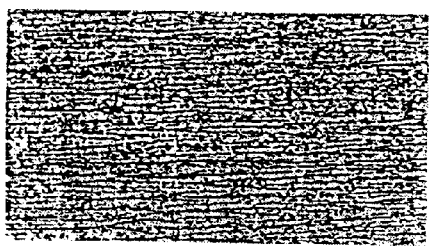
FIG. 21 is an illustration of the coated texture of FIG. 16.
Figure 22:
FIG. 22 is an illustration of the coated texture of FIG. 17.
Figure 23:
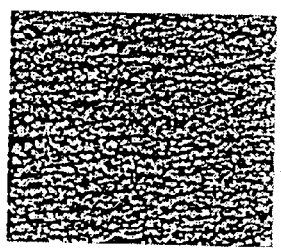
FIG. 23 is an illustration of the coated texture of FIG. 18.

This example shows the effects of the size of the texture-producing particles on the cured coating texture. Four pre-cured coating mixtures were prepared as in Example 15 where 6.25% of ORGASOL 2002 polyamide 12 texture-producing particles was added to the pre-cured UV-resin described in Table 2. The four mixtures differed in that each contained a different sized particle of ORGASOL 2002: 30 µm (grade ES 3), 40 µm (grade ES 4), 50 µm (grade ES 5), and 60 µm (grade ES 6). Each mixture was applied at 70° C. to sheet vinyl and coated with an air knife. All coatings were UV-cured under inert conditions. The cured coating containing the 30 µm particles had a visibly fairly smooth surface with a matte finish. The coatings with the larger particles had progressively more visible texture as the particle size increased, where the 60 µm particles gave the most visible and aggressive (largest textural features) texture. The scratch resistance of the coatings improved with increasing particle size, where 60 µm showed almost no visible scratches after the Taber scratch test. FIG. 9 is a photograph of: the top of a portion of the coated substrate produced using the 60 µm particles, and FIG. 10 is a photograph of the top of a portion of the coated substrate produced using the 40 µm particles. The difference in the aggressiveness of the texture is evident. It should be appreciated, however, that the concentration of particles used would also be expected to have an influence on textural aggressiveness.

For illustrative purpose, "traces" of the surface textures of these samples were obtained by rubbing a soft graphite pencil over translucent tracing paper that was itself placed on top of the textured surfaces. The traces were then digitally scanned. FIG. 11 shows the texture of the coating producing using the 60 µm particles, and FIG. 12 shows the texture of the coating produced using the 40 µm particles. The traces clearly show the decrease in textural aggressiveness as nylon particle size is decreased from 60 µm as shown in FIG. 11 to 40 µm in FIG. 12.

These traces also allow for estimation of certain features of the texture. FIG. 13 is an illustration of the general type of macroscopic texture produced by the coatings in this Example 16. As shown, three parameters, a, b and c, are defined to describe certain planar features of the texture. These parameters are defined as follows: "a" represents the distance between peaks of the texture, "b" represents the width of each textural feature, and "c" represents the length of each textural feature. These parameters were measured manually from the corresponding traces and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 16 are as follows: for the coating made with 60 µm particles a ranges from 10–50 mils, b ranges from 5–30 mils, and c ranges from 100–350 mils, for the coating made with 40 µm particles a ranges from 5–30 mils, b ranges from 1–20 mils, and c ranges from 10–150 mils, and for the coating made with 30 µm particles a ranges from 5–20 mils, b ranges from 1–10 mils and c ranges from 1–50 mils.

The average gloss values (60°) and the textural relief values (defined as maximum coating thickness minus minimum coating thickness) were also measured for the coatings produced by this Example 16. The gloss values are 10.8, 16.9, and 35.3 for the coatings made with 60 µm, 40 µm, and 30 µm particles, respectively. The textural relief values are 1.99 mils, 0.52 mils, and 0.29 mils for the coatings made with 60 µm, 40 µm, and 30 µm particles, respectively.

EXAMPLE 17

This example describes textured coatings containing organic texture-producing particles, an inorganic RCA with a coupling agent, and both organic and inorganic flatting agents. Per-cured coating mixtures having the composition shown in Table 9 were mixed with a Cowles blade mixer.

TABLE 9

Pre-Cured Coating Mixture Compositions in Weight Percent

| Component | Coating A | Coating B |
|---|---|---|
| UV-Curable Resin from Table 2 | 85.62 | 85.95 |
| ORGASOL 2002 ES 6 (60 μm texture-producing particle) | 6.12 | 6.25 |
| ORGASOL 2001 UD (5 μm organic flatting agent) | 6.0 | 0 |
| ACEMATTE OK 412 (3 μm inorganic flatting agent) | 0 | 5.49 |
| NANOTEK ALUMINA (inorganic RCA) | 1.96 | 2 |
| Prehydrolyzed Z-6030 (coupling agent from Example 1) | 0.30 | 0.31 |

Both coatings were applied to flexible sheet vinyl at 70° C. and coated with an air knife. These coated substrates were UV-cured under atmospheric and then inert environments. The resulting cured coatings were transparent and had sandpaper-like macroscopic texture and matte finishes.

EXAMPLE 18

This example demonstrates the use of a roll coater application method for generating and controlling macroscopic texture similar to that of wood-grain. Three pre-cured coating mixtures were used, including the coating of Example 9 (30% nano-alumina inorganic RCA), the coating of Example 12 (organic RCA), and the coating of Example 16 (60 μm texture-generating nylon particles). These pre-cured coating mixtures were then applied to cleaned, semi-rigid vinyl tile flooring substrates using a pipette or spatula as described in Example 6. Distribution of the pre-cured coating mixture to a macroscopically textured state and removal of excess coating was then achieved by passing the samples through a two-roll coater under the process conditions listed in Table 10. Specifically, Table 10 gives the conditions for the upper roll, which actually makes contact with and the pre-cured coating to provide macroscopic texture. More specifically, the upper roll acts to split the pre-cured coating mixture that has been applied to the substrate between the upper roll and the substrate and is referred to as "film-splitting," where "film" refers to the pre-cured coating mixture as applied to the substrate. This film-splitting phenomenon acts to form the macroscopic texture of the coating on the substrate. The gap indicated is between the upper roll and the uncoated substrate surface when the uncoated substrate is between the rolls (i.e., total gap minus substrate thickness). Also, in the case where the upper roll is rotating, the rotation is away from the surface of the sample. In all cases, the lower roll carried the samples between the rolls at 100 fpm and, upon exiting the roll coater, the pre-cured coated samples were cured under an inert ($N_2$) environment at 100 fpm.

TABLE 10

Roll Coated Sample Compositions and Process Conditions

| Sample and Figure Identification | Coating | Process Conditions |
|---|---|---|
| 1 (FIGS. 14 and 19) | Organic RCA Coating of Example 12 | Hard rubber roll (stationary) Gap = 4.0 mils |
| 2 | Inorganic RCA | Hard rubber roll (stationary) |

TABLE 10-continued

Roll Coated Sample Compositions and Process Conditions

| Sample and Figure Identification | Coating | Process Conditions |
|---|---|---|
| (FIGS. 15 and 20) | Coating of Example 9 | Gap = 4.0 mils |
| 3 (FIGS. 16 and 21) | Organic RCA Coating of Example 12 | Hard rubber roll (stationary) Gap = −10 mils (compressed) |
| 4 (FIGS. 17 and 22) | Organic RCA Coating of Example 12 | Soft rubber roll (rotating 100 fpm) Gap = 0.0 mils |
| 5 (FIGS. 18 and 23) | Texture-Generating Particles Coating of Example 16 | Hard rubber roll (stationary) Gap = 18 mils |

FIGS. 14–18 are photographs of the top of a portion of each coated substrate made using coatings 1–5 listed in Table 10, respectively. FIGS. 19–23 are traces, made as described in Example 16, of the surface textures of these coated substrates having coatings 1–5 listed in Table 10, respectively. Gloss (60°) and gauge (thickness) measurements are given in Table 11, where textural relief is calculated as the maximum gauge minus the minimum gauge (in mils). Note that the gloss is reported for both the in-line direction (i.e., the direction that the sample traveled while passing through the roll coater) and for the transverse direction. Gauge measurements were made using a light microscope equipped with a microscale and involved viewing cross-sections of the cured samples cut in the transverse direction.

Figure 24:
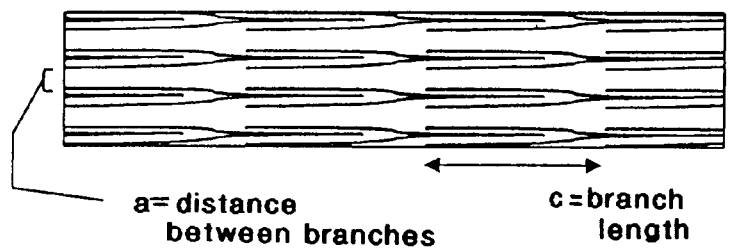
FIG. 24 is an illustration of the general type of macroscopic texture according to another embodiment of the present invention.
Figure 25:
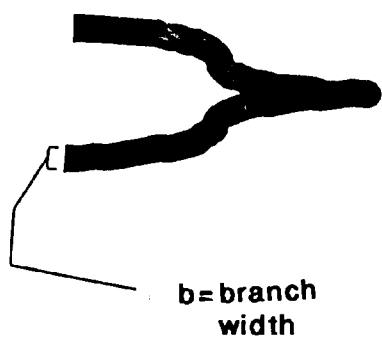
FIG. 25 is an enlarged view of a portion of FIG. 24.

FIG. 24 illustrates the general type of macroscopic texture produced by the coatings in this Example 18, and FIG. 25 is an enlarged view of a portion of FIG. 24. As shown, the texture produced in this Example 18 can be described as "branched". FIGS. 24 and 25 show three parameters, a, b and c, that are defined to describe certain planar features of the texture. These parameters are defined as follows: "a" represents the distance between branches of the texture, "b" represents the width of each branch, and "c" represents the length of each branch. These parameters were measured manually from the traces for each of the coatings shown in FIGS. 19–23 and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 18 are provided in Table 11.

TABLE 11

Gloss and Texture Measurements of Roll Coated Samples

| Sample | Gloss (60°) | | Gauge (mils) | | Relief (mils) | Range of Planar Dimensions (mils) | | |
|---|---|---|---|---|---|---|---|---|
| | In-line | Trans. | Min | Max | | a | b | c |
| 1 | 50.2 | 15.5 | 1.20 | 2.44 | 1.24 | 40–100 | 10–20 | 100–1500 |
| 2 | 69.3 | 21.2 | 1.35 | 2.34 | 0.99 | 40–100 | 10–20 | 100–1700 |
| 3 | 65.8 | 29.2 | 0.69 | 1.11 | 0.42 | 20–30 | 5–10 | 100–1000 |

TABLE 11-continued

Gloss and Texture Measurements of Roll Coated Samples

| Sample | Gloss (60°) In-line | Gloss (60°) Trans. | Gauge (mils) Min | Gauge (mils) Max | Relief (mils) | Range of Planar Dimensions (mils) a | b | c |
|---|---|---|---|---|---|---|---|---|
| 4 | 32.1 | 16.4 | 1.08 | 2.69 | 1.61 | 40–70 | 10–20 | 100–200 |
| 5 | 27.6 | 17.4 | 0.79 | 1.71 | 0.92 | 40–70 | 20–40 | 300–500 |

These results show that a range of texture similar to that of wood-grain may be achieved by adjustment of process conditions during the roll coating application of the pre-cured coating mixtures. Key parameters appear to be the rotational speed of the upper roll that directly contacts the pre-cured coating, the gap between the upper roll and the sample, and the hardness of the upper roll.

If the upper roll is moving in the line direction, then the pre-cured coating film is split quickly as the moving roll pulls a fraction of the coating away from the coated substrate. This results in very short textural branches (see, for example, FIG. 18). Conversely, a stationary upper roll does not split the film as rapidly, allowing the branches to extend to much longer lengths before a fraction of the branching film detaches from the substrate and ends the branch. This macroscopic texture is best described as "wood-grain" in nature. Moreover, the wood-grain texture may be further controlled by adjusting the gap. A smaller gap yields a more finely scaled wood-grain texture (e.g., compare FIGS. 19 and 21). The use of texture-producing particles in a roll-coated pre-cured coating mixture produces a hybrid macroscopic texture that contains both wood-grain and "sandpaper-like" textural elements (see, for example, FIGS. 18 and 22). The hardness of the upper roll is also expected to affect the film splitting behavior of the roll-coating application method, as are intrinsic pre-cured coating properties such as viscosity and particle density.

EXAMPLE 19

This example illustrates how the manipulation of process conditions may be used to control the aggressiveness of macroscopic texture generated by an air knife coating application method. Two pre-cured coating mixtures were used, the first being the coating of Example 9 (30% nano-alumina: inorganic RCA). The second pre-cured coating consisted of the coating composition given in Example 15, with the exception that the organic texture-generating particles were 40 μm polypropylene particles added at 5 wt. % (Propyltex 200S available from Micro Powders, Inc., Tarrytown, N.Y.) instead of the 6.25 wt. % nylon particles. These pre-cured coating mixtures were applied to flexible sheet vinyl floor with an air knife using the process conditions indicated in Table 12. The pre-cured coated samples were then cured under an inert ($N_2$) environment at 100 fpm.

TABLE 12

Air Knife Coater Sample Compositions and Process Conditions

| Sample and Figure Identification | Line Speed | Air Knife Pressure |
|---|---|---|
| Inorganic RCA Coating | | |
| 1 (FIGS. 26 and 29) | 100 | 4.0 |
| 2 (FIGS. 27 and 30) | 50 | 4.0 |
| 3 (FIGS. 28 and 31) | 10 | 4.0 |
| Particle Coating | | |
| 4 | 100 | 4.0 |
| 5 | 10 | 4.0 |
| 6 | 100 | 1.5 |
| 7 | 10 | 1.5 |

Figures 26, 27, 28:
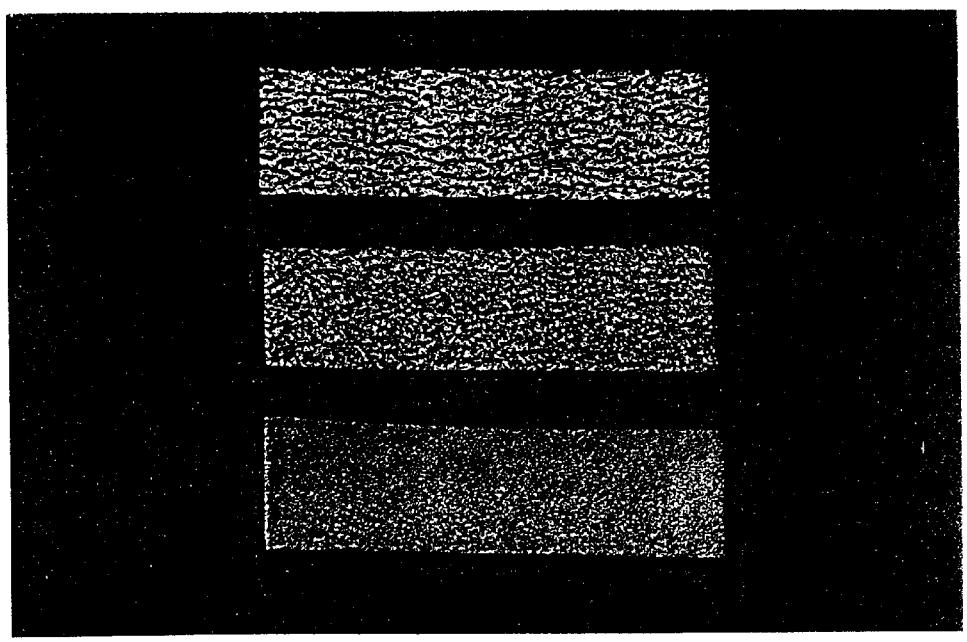
FIG. 26 is a photograph of the top of a portion of the coated substrate produced according to another embodiment of the present invention.
FIG. 27 is a photograph of the top of a portion of the coated substrate produced according to another embodiment of the present invention.
FIG. 28 is a photograph of the top of a portion of the coated substrate produced according to another embodiment of the present invention.
Figure 29:
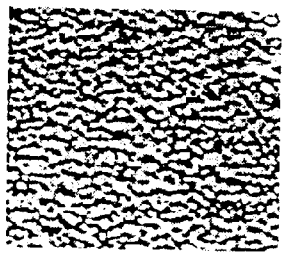
FIG. 29 is an illustration of the coated texture of FIG. 26.
Figure 30:
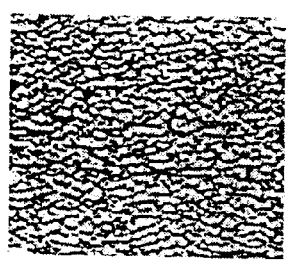
FIG. 30 is an illustration of the coated texture of FIG. 27.
Figure 31:
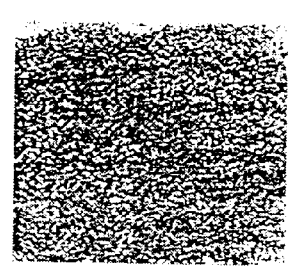
FIG. 31 is an illustration of the coated texture of FIG. 28.

FIGS. 26–28 are photographs of the top of a portion of each coated substrate made using coatings 1–3 listed in Table 12, respectively. FIGS. 29–31 are traces, made as described in Example 16, of the surface textures of these coated substrates having coatings 1–3 listed in Table 12, respectively. These figures show that the macroscopic texture produced using the inorganic RCA are wave-like. Traces of the particle textures for samples 4–7 in Table 12 were not made, but traces of similar particle-generated "sandpaper" macroscopic texture can be found in Example 16.

Figure 32:
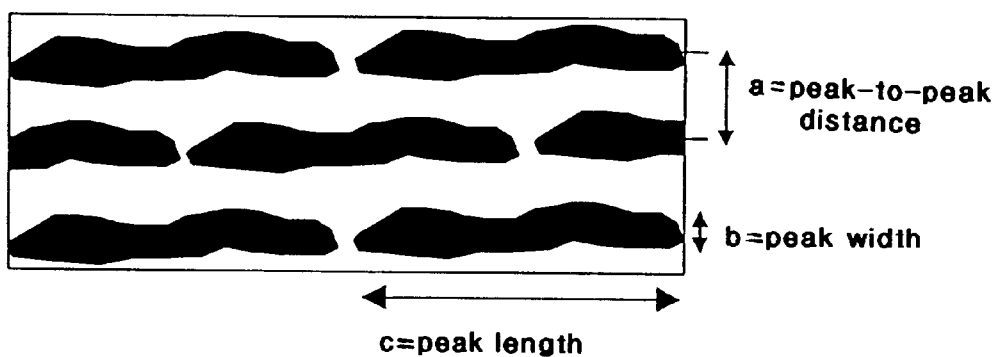
FIG. 32 is an illustration of the general type of macroscopic texture according to another embodiment of the present invention.

FIG. 32 is an illustration of the general type of wave-like macroscopic texture produced by the coatings in this Example 19. As shown, three parameters, a, b and c, are defined to describe certain planar features of the texture. These parameters are defined as follows: "a" represents the distance between peaks of the texture, "b" represents the width of each textural feature, and "c" represents the length of each textural feature. These parameters were measured manually from the corresponding traces and, therefore, may have substantial inherent error associated with them; however, they can be used to distinguish gross differences between the textures. Regardless, these parameters should not be viewed or used as limiting the type, shape, or size of the macroscopic texture. The ranges for these parameters for the coatings produced in this Example 19 are provided in Table 13. Gloss (60°) and gauge (thickness) measurements are also given in Table 13 and follow the same conventions as the gloss and gauge data presented in Example 18.

TABLE 13

Gloss and Texture Measurements for Air Knife Coated Samples

| Sample | Gloss (60°) In-line | Gloss (60°) Trans. | Gauge (mils) Min | Gauge (mils) Max | Relief (mils) | Ranges of Planar Dimensions (mils) a | b | c |
|---|---|---|---|---|---|---|---|---|
| 1 | 20.0 | 29.6 | 2.62 | 4.24 | 1.62 | 50–100 | 20–50 | 20–350 |
| 2 | 17.6 | 21.6 | 1.68 | 3.31 | 1.63 | 20–70 | 10–20 | 10–400 |

TABLE 13-continued

Gloss and Texture Measurements for Air Knife Coated Samples

| Sample | Gloss (60°) | | Gauge (mils) | | Relief (mils) | Ranges of Planar Dimensions (mils) | | |
|---|---|---|---|---|---|---|---|---|
| | In-line | Trans. | Min | Max | | a | b | c |
| 3 | 23.3 | 30.5 | 0.66 | 1.06 | 0.40 | 10–20 | 5–10 | 20–100 |
| 4 | 62.4 | 58.0 | 0.97 | 1.44 | 0.47 | | | |
| 5 | 37.4 | 36.0 | 0.45 | 0.85 | 0.40 | | | |
| 6 | 74.9 | 75.3 | 2.62 | 2.62 | 0.00 | | | |
| 7 | 16.9 | 17.1 | 0.61 | 1.61 | 1.00 | | | |

These results show that it is possible to control the aggressiveness of macroscopic textures generated with an air knife by adjusting the process conditions. For the high viscosity coating that employs an RCA as part of its composition, the wave-like macroscopic textures progress from relatively large and broad features at fast line speeds to texture with a very fine, satin finish at low line speeds. Note that even in the latter case (FIGS. 28 and 31) the fine wave-like features can still be distinguished with the unaided eye. Also note that the same pre-cured coating composition was used in samples 1–3, illustrating the appreciable textural control that may be attained from the coating application method alone.

Similar textural control is achieved using a coating with texture-producing particles ("sandpaper" texture), as indicated by the large variations in gloss and relief shown in Table 13 for samples 4–7 (similarly, a single pre-cured coating composition was used in sample 4–7. In general, lower gloss and higher relief correspond to more aggressive textures. However, variations in the planar dimensions and in the average gauge (average of the minimum and maximum gauges) are also important for the overall perceived aggressiveness of the textures (and may also influence gloss readings).

EXAMPLE 20

Figure 33:
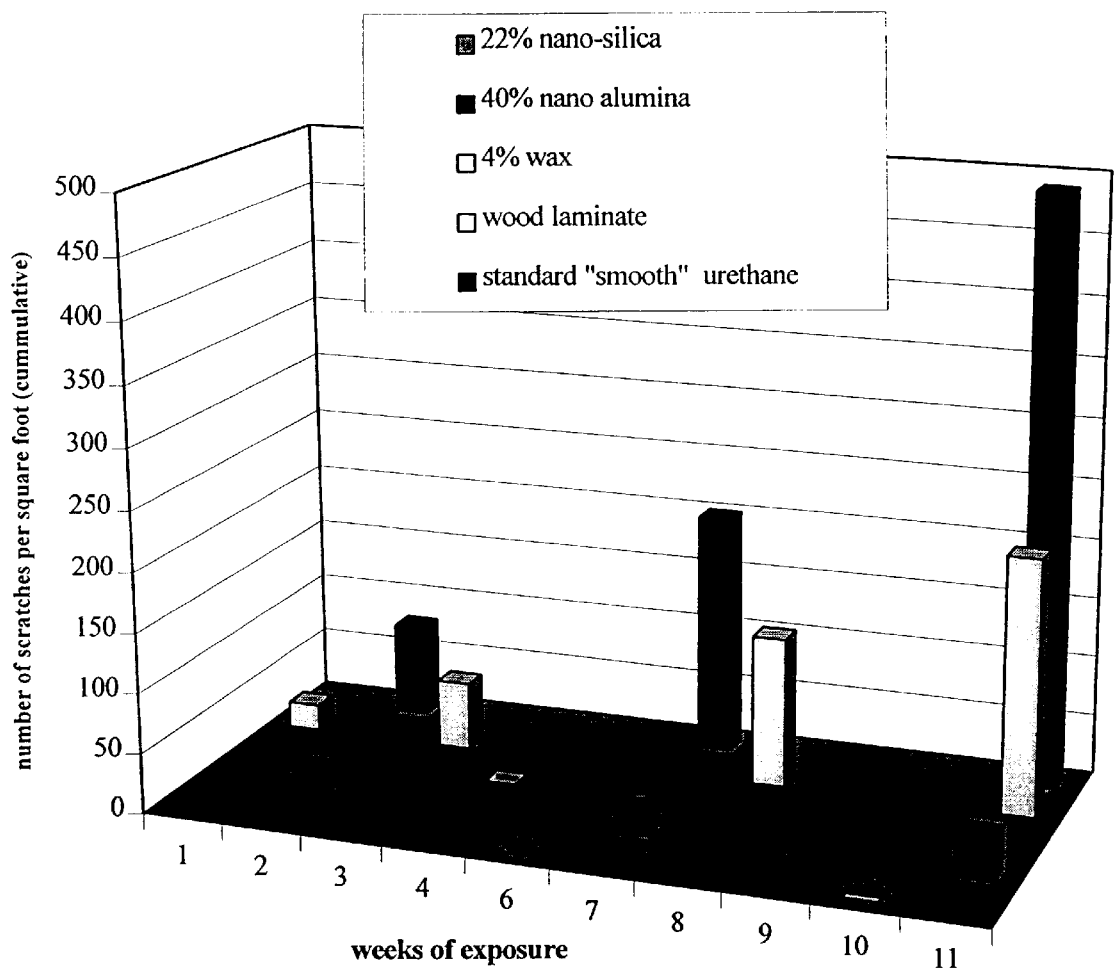
FIG. 33 is a graph of the results of scratch resistance tests for several coatings made according to various embodiments of the present invention.

This example shows the scratch resistance properties of cured coating having macroscopic texture. The pre-cured coating mixtures 4 (40% nano-alumina) and 7 (22% nono-silica) in Example 6 and the coating in Example 12 (4% wax) were coated as described in Example 6 on flexible vinyl sheet flooring and UV cured under inert conditions as described in Example 6. These cured coatings had macroscopic wave-like texture. Pieces measuring 9 in$^2$ were mounted on plywood and placed on the floor in a high traffic area (a cafeteria). After a given amount of time the floor panels were pulled up, cleaned, and evaluated for scratch resistance. The scratch resistance was measured by counting the total number of scratches on a given coating and dividing by the total area in square feet. As controls, a standard high gloss (80–90%) macroscopically smooth urethane containing no inorganics and a wood laminate floor were also evaluated. The results of these tests are shown in FIG. 33. The scratch data clearly show that the textured urethane coatings have fewer scratches per square foot of exposed surface than the standard smooth urethane and the wood laminate.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A pre-cured coating mixture, comprising:

a radiation-curable resin;

an initiator;

a rheological control agent comprising a plurality of alumina particles having an approximate size in the range of 27–56 nanometers;

a plurality of texture-producing particles comprising 60 micron-sized nylon 12 particles;

a coupling agent comprising prehydrolyzed silane; and wherein said radiation-curable resin, said initiator, said rheological control agent, and said plurality of texture-producing particles form a pre-cured coating mixture capable of forming a macroscopic texture upon application of said pre-cured coating mixture on a substrate.

2. The pre-cured coating mixture of claim 1 further comprising:

a flatting agent comprising 5 micron-sized nylon particles; and wherein said radiation-curable resin comprises a mixture of urethane acrylate, ethoxylated diacrylate, propoxylated diacrylate, and ethoxylated trimethlyolpropane triacrylate, and wherein said initiator comprises acylphosphine oxide.

3. The pre-cured coating mixture of claim 1 wherein said rheological control agent is approximately 1–80%, by weight, of said pre-cured coating mixture.

4. The pre-cured coating mixture of claim 1 wherein said pre-cured coating mixture has a viscosity of approximately 100,000–1,000,000 cPs at a shear rate of 0.150 s$^{-1}$.

5. The pre-cured coating mixture of claim 1 further comprising:

a flatting agent comprising 3 micron-sized nylon particles; and wherein said radiation-curable resin comprises a mixture of urethane acrylate, and ethoxylated trimethlyolpropane triacrylate, and wherein said initiator comprises acylphosphine oxide.

6. A pre-cured coating mixture, comprising:

a radiation-curable resin;

an initiator; and a rheological control agent comprising inorganic particles having an approximate size in the range from 27–56 nanometers;

wherein said radiation-curable resin, said initiator, and said rheological control agent form a pre-cured coating mixture having a viscosity of approximately 100,000–1,000,000 cPs at a shear rate of 0.150 s$^{-1}$ that is capable of forming a macroscopic texture upon application of said pre-cured coating mixture on a substrate.

7. A pre-cured coating mixture, comprising:

a radiation-curable resin;

an initiator; and a rheological control agent comprising inorganic particles comprising nanometer-sized alumina;

wherein said radiation-curable resin, said initiator, and said rheological control agent form a pre-cured coating mixture having a viscosity of approximately 100,000–1,000,000 cPs at a shear rate of 0.150 s$^{-1}$ that is capable of forming a macroscopic texture upon application of said pre-cured coating mixture on a substrate.

8. A pre-cured coating mixture, comprising:

a radiation-curable resin;

an initiator; and a rheological control agent comprising inorganic particles comprising aluminosilicates;

wherein said radiation-curable resin, said initiator, and said rheological control agent form a pre-cured coating mixture having a viscosity of approximately 100,000–1,000,000 cPs at a shear rate of 0.150 s$^{-1}$ that is capable of forming a macroscopic texture upon application of said pre-cured coating mixture on a substrate.

9. A pre-cured coating mixture, comprising:

a radiation-curable resin;

an initiator; and a rheological control agent comprises organic solids selected from the group consisting of low molecular weight waxes, polymers of ethylene glycol, polymers of propylene glycol, natural polymers, polyamides, polypropylene, and mixtures thereof;

wherein said radiation-curable resin, said initiator, and said rheological control agent form a pre-cured coating mixture having a viscosity of approximately 100,000–1,000,000 cPs at a shear rate of 0.150 s$^{-1}$ that is capable of forming a macroscopic texture upon application of said pre-cured coating mixture on a substrate.

10. A pre-cured coating mixture, comprising:

a radiation-curable resin;

an initiator;

a rheological control agent comprising inorganic particles having an approximate size in the range from 27–56 nanometers;

a plurality of texture-producing particles; and wherein said radiation-curable resin, said initiator, said rheological control agent, and said plurality of texture-producing particles form a pre-cured coating mixture capable of forming a macroscopic texture upon application of said pre-cured coating mixture on a substrate.

11. The pre-cured coating mixture of claim 10 wherein said rheological control agent is approximately 1–80%, by weight, of said pre-cured coating mixture.

12. The pre-cured coating mixture of claim 10 further comprising a coupling agent.

13. The pre-cured coating mixture of claim 10 wherein said pre-cured coating mixture has a viscosity of approximately 100,000–1,000,000 cPs at a shear rate of 0.150 s$^{-1}$.

14. A pre-cured coating mixture, comprising:

a radiation-curable resin;

an initiator;

a rheological control agent comprising inorganic particles comprising aluminosilicates;

a plurality of texture-producing particles; and wherein said radiation-curable resin, said initiator, said rheological control agent, and said plurality of texture-producing particles form a pre-cured coating mixture capable of, forming a macroscopic texture upon application of said pre-cured coating mixture on a substrate.

15. The pre-cured coating mixture of claim 14 wherein said rheological control agent is approximately 1–80%, by weight, of said pre-cured coating mixture.

16. The pre-cured coating mixture of claim 14 further comprising a coupling agent.

17. The pre-cured coating mixture of claim 14 wherein said pre-cured coating mixture has a viscosity of approximately 100,000–1,000,000 cPs at a shear rate of 0.150 s$^{-1}$.

* * * * *

US006399670C1

(12) INTER PARTES REEXAMINATION CERTIFICATE (0056th)

United States Patent
MacQueen et al.

(10) Number: US 6,399,670 C1
(45) Certificate Issued: Apr. 7, 2009

(54) COATING HAVING MACROSCOPIC TEXTURE AND PROCESS FOR MAKING SAME

(75) Inventors: Richard C. MacQueen, Phillipsburg, NJ (US); Loyd J. Burcham, Horsham, PA (US); Anthony A. Parker, Newtown, PA (US); Deborah A. Sciangola, Glenmoore, PA (US)

(73) Assignee: Congoleum Corporation, Trenton, NY (US)

Reexamination Request:
No. 95/000,009, Jan. 8, 2003

Reexamination Certificate for:
Patent No.: 6,399,670
Issued: Jun. 4, 2002
Appl. No.: 09/489,420
Filed: Jan. 21, 2000

(51) Int. Cl.
*B05D 5/002* (2006.01)
*B05D 3/006* (2006.01)
*C09D 7/012* (2006.01)
*C09D 5/028* (2006.01)
*C08J 3/024* (2006.01)

(52) U.S. Cl. .......................... 522/64; 522/142; 522/173; 522/182; 522/77; 522/81; 522/83; 522/96

(58) Field of Classification Search .................. None
See application file for complete search history.

(56) References Cited

U.S. PATENT DOCUMENTS

| | | | | |
|---|---|---|---|---|
| 3,550,345 A | * | 12/1970 | Vanderbilt et al. ............. 53/458 |
| 4,196,243 A | | 4/1980 | Sachs et al. |
| 4,759,991 A | * | 7/1988 | Kanno et al. ................. 428/447 |
| 5,585,415 A | | 12/1996 | Gorzalski et al. |
| 5,665,807 A | * | 9/1997 | Roman et al. ................. 524/404 |
| 5,824,732 A | | 10/1998 | Jablon |
| 5,928,778 A | | 7/1999 | Takahashi et al. |
| 5,975,988 A | | 11/1999 | Christianson |
| 6,228,463 B1 | | 5/2001 | Chen et al. |

OTHER PUBLICATIONS

Encyclopedia of Chem.Tech., Kirk–Othmer, 4th Ed. vol. 5., John Wiley & Sons 1993.
Disparlon 6500 data sheet from Kusumoto Chemicals, Ltd.
Optimizing the Use of Ultrafine Microporous Polyamide Powders to Obtain Low–Gloss Coatings, by F. D. C. Gallouedec, RadTech Report Sep./Oct. 95.
Aerosil 200 Hydrophilic fumed Silica data sheet.
Aerosilr972 Hydrophobic fumed Silica data sheet.
Aerosil R 974 Hydrophobic fumed Silica data sheet.

* cited by examiner

*Primary Examiner*—Jerry D. Johnson

(57) ABSTRACT

In one embodiment the present invention provides a coated substrate comprising a substrate, a radiation-cured coating on at least a portion of the substrate, wherein the coating comprises an inherent macroscopic texture. In another embodiment, the present invention provides a pre-cured coating mixture comprising a radiation-curable resin and an initiator, wherein the radiation-curable resin and the initiator form a pre-cured coating mixture capable of forming a macroscopic texture upon application of the mixture on a substrate. In another embodiment the present invention provides a pre-cured coating mixture comprising a radiation-curable resin, an initiator, and texture-producing particles having an effective size to provide a macroscopic texture upon application of the mixture on a substrate. In another embodiment, the present invention provides a coated substrate comprising a substrate and a radiation-cured coating on at least a portion of the substrate, wherein the coating comprises an inherent macroscopic texture. In addition, the present invention provides a process for making a coating on a substrate, comprising the steps of distributing a pre-cured coating mixture comprising a radiation-curable resin and an initiator over at least a portion of a substrate to form a pre-cured coating having a macroscopic texture, and radiation-curing the pre-cured coating to form a radiation-cured coating having the macroscopic texture.

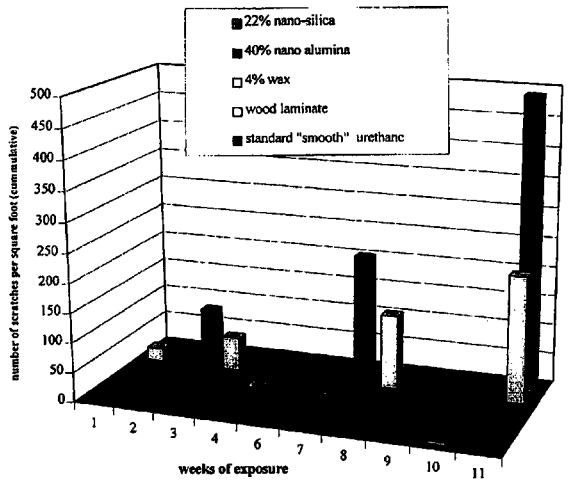

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–17 are cancelled.

\* \* \* \* \*